US011374229B2

(12) United States Patent
Iwata et al.

(10) Patent No.: US 11,374,229 B2
(45) Date of Patent: Jun. 28, 2022

(54) METAL-AIR BATTERY AND METHOD OF PRODUCING AIR ELECTRODE

(71) Applicant: Nippon Telegraph and Telephone Corporation, Tokyo (JP)

(72) Inventors: Mikayo Iwata, Musashino (JP); Masaya Nohara, Musashino (JP); Shuhei Sakamoto, Musashino (JP); Masahiko Hayashi, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,530

(22) PCT Filed: May 9, 2019

(86) PCT No.: PCT/JP2019/018519
§ 371 (c)(1),
(2) Date: Oct. 21, 2020

(87) PCT Pub. No.: WO2019/220999
PCT Pub. Date: Nov. 21, 2019

(65) Prior Publication Data
US 2021/0249664 A1  Aug. 12, 2021

(30) Foreign Application Priority Data

May 18, 2018  (JP) .............................. JP2018-096096

(51) Int. Cl.
*H01M 4/88* (2006.01)
*H01M 4/38* (2006.01)
(Continued)

(52) U.S. Cl.
CPC ........... *H01M 4/8878* (2013.01); *H01M 4/38* (2013.01); *H01M 4/8626* (2013.01);
(Continued)

(58) Field of Classification Search
CPC ........... H01M 12/06; H01M 2004/027; H01M 2004/8689; H01M 4/38; H01M 4/42;
(Continued)

(56) References Cited

U.S. PATENT DOCUMENTS

2017/0237135 A1* 8/2017 Iida ...................... G01N 27/308
429/405

FOREIGN PATENT DOCUMENTS

CN  107785589 A * 3/2018 .............. H01M 4/88
JP  2015-173079 A  10/2015
(Continued)

OTHER PUBLICATIONS

Machine Translation CN107785589A (Year: 2018).*
(Continued)

*Primary Examiner* — Victoria H Lynch
(74) *Attorney, Agent, or Firm* — Workman Nydegger

(57) ABSTRACT

An object of the present invention is to improve the performance of a metal-air battery. The metal-air battery includes an air electrode, an anode, and an electrolyte sandwiched between the air electrode and the anode. The air electrode includes a co-continuous body having a three dimensional network structure formed by an integrated plurality of nanostructures having branches. A magnesium alloy is used for the anode, and a weak acidic salt containing no chloride ion or a salt considered to have a buffering capacity is used for the electrolyte. Consequently, the present invention can efficiently utilize electrons and suppress passivation and self corrosion of the anode, thereby improving the performance of the metal-air battery.

16 Claims, 5 Drawing Sheets

(51) Int. Cl.
*H01M 4/86* (2006.01)
*H01M 12/06* (2006.01)
*H01M 4/02* (2006.01)

(52) U.S. Cl.
CPC ...... *H01M 12/06* (2013.01); *H01M 2004/027* (2013.01); *H01M 2004/8689* (2013.01)

(58) Field of Classification Search
CPC ........ H01M 4/46; H01M 4/86; H01M 4/8626; H01M 4/88; H01M 4/8878; H01M 4/90; Y02E 60/10
See application file for complete search history.

(56) References Cited

FOREIGN PATENT DOCUMENTS

| | | |
|---|---|---|
| JP | 2017-228446 A | 12/2017 |
| WO | 2016/002277 A1 | 1/2016 |

OTHER PUBLICATIONS

International Search Report dated Jul. 16, 2019, issued in PCT Application No. PCT/JP2019/018519, filed May 9, 2019.
Y. Xue et al., *Template-Directed Fabrication of Porous Gas Diffusion Layer for Magnesium Air Batteries*, Journal of Power Sources, vol. 297, 2015, pp. 202-207.
Naiguang Wang et al., *Discharge Behaviour of Mg—Al—Pb and Mg—Al—Pb—In Alloys as Anodes for Mg-Air Battery*, Electrochimica Acta, vol. 149, 2014, pp. 193-205.

* cited by examiner

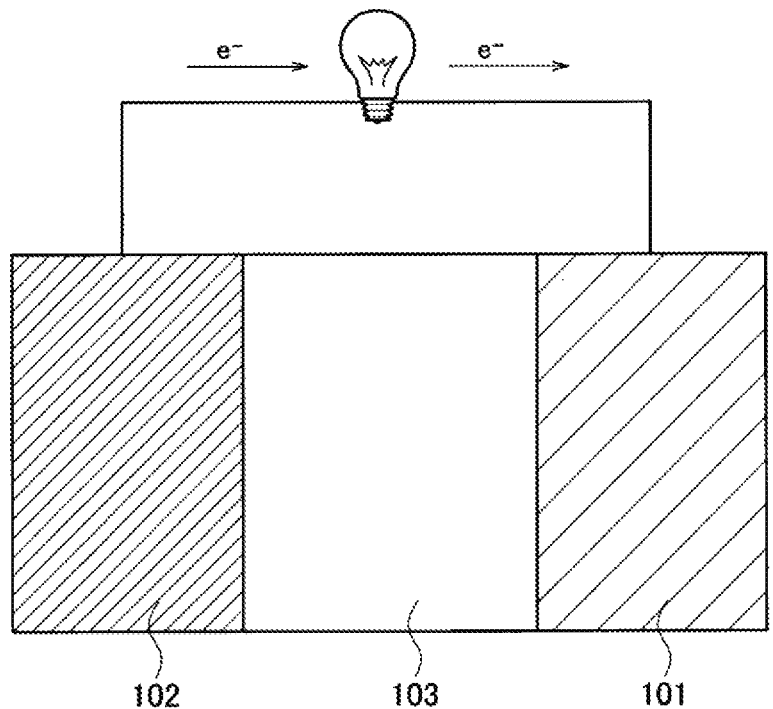
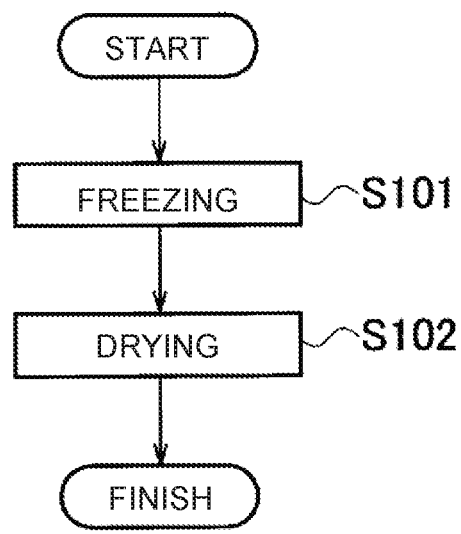

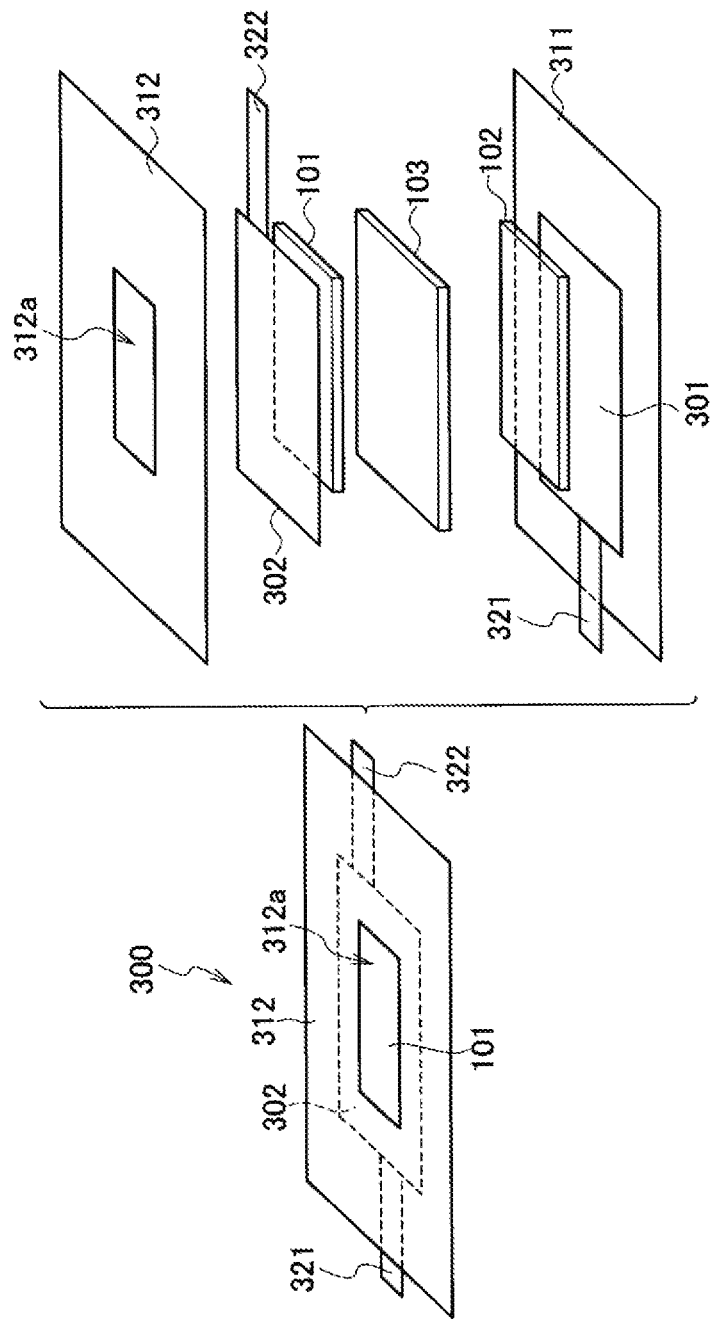

METAL-AIR BATTERY AND METHOD OF PRODUCING AIR ELECTRODE

TECHNICAL FIELD

The present invention relates to a metal-air battery and a method for producing an air electrode thereof.

BACKGROUND ART

Conventionally, alkaline batteries and zinc-carbon batteries have widely been used as disposable primary batteries. Also, along with the evolution of IoT (Internet of Things) in recent years, the development of scattering sensors, which are installed at each and every place in the natural world such as soil and forest is advancing, and small sized high performance coin type lithium primary batteries corresponding to a variety of applications such as these sensors are being widespread.

However, the disposable batteries generally used at present are often constituted by a rare metal such as lithium, nickel, manganese and cobalt, and thus have a problem of the depletion of resources. In addition, a strong alkali such as an aqueous sodium hydroxide solution or an organic electrolytic solution is used as the electrolytic solution, and this makes the final disposal difficult. Moreover, the presently used disposable batteries may pose a risk of affecting the surrounding environment depending on the environment for use such as a case in which they are used as the driving source for sensors to be buried in soil.

In order to solve the problems as mentioned above, mention may be made of a metal-air battery as a potential candidate for a battery with a low environmental load. In the metal-air battery, oxygen and water are used as the cathode active materials and a metal such as magnesium, iron, aluminum and zinc is used for the anode, and therefore, its impact on soil contamination or the like, as well as the influence on the ecosystem, is low. In addition, these materials are abundant from the viewpoint of resources, and are inexpensive compared to rare metals. In particular, a zinc air battery, which uses zinc as the anode, is commercially available as the driving source for hearing aids or the like, and the research and development of a metal-air battery in which magnesium is used as the anode is also in progress as a battery with a low environmental load (see Non-Patent Literature 1 and Non-Patent Literature 2).

CITATION LIST

Non-Patent Literature

Non-Patent Literature 1: Y. Xue et al., "Template-directed fabrication of porous gas diffusion layer for magnesium air batteries", Journal of Power Sources, vpl. 297, pp. 202-207, 2015.
Non-Patent Literature 2: N. Wang et al., "Discharge behaviour of Mg—Al—Pb and Mg—Al—Pb—In alloys as anodes for Mg-air battery", Electrochimica Acta, vol. 149, pp. 193-205, 2014.

SUMMARY OF THE INVENTION

Technical Problem

However, in Non-Patent Literature 1, a fluororesin is used as a binder for the air electrode, and also in Non-Patent Literature 2, a metal containing lead or indium is used for the anode. Accordingly, these batteries are constituted by materials that may pose a risk of affecting the natural environment, such as soil contamination.

As a battery for solving the problems as described above, mention may be made of the above-mentioned metal-air battery, but while they can eliminate environmental problems by not using environmentally hazardous substances such as rare metals, there is a problem that the battery performance is decreased when the battery is constituted without using rare metals or the like.

For example, with respect to a neutral electrolyte with a low environmental load, when a chloride salt such as sodium chloride and potassium chloride is used as the main electrolyte, the anode is corroded by the chloride ion and the utilization efficiency of the anode is decreased, thereby presenting a problem that the corrosion of the anode needs to be suppressed. Furthermore, the pH of the electrolytic solution is elevated along with the progression of the battery reaction and the passive film is likely to be formed on the anode, and therefore, the reaction gradually becomes unlikely to occur and the discharge capacity of the battery itself becomes small. Accordingly, there has been a problem that the passivation needs to be suppressed.

The present invention has been made to solve the problems as described above, and an object thereof is to improve the performance of a metal-air battery.

Means for Solving the Problem

A metal-air battery according to claim 1 comprises: an air electrode constituted by a co-continuous body having a three dimensional network structure in which a plurality of nanostructures is integrated through a noncovalent bond; an anode; and an electrolyte disposed between the air electrode and the anode and constituted by a salt containing no chloride ion.

With respect to a metal-air battery according to claim 2, in the metal-air battery according to claim 1, the electrolyte is constituted by one or more of an acetate, a carbonate, a citrate, a phosphate, HEPES (4-(2-hydroxyethyl)-1-piperazineethanesulfonic acid), a pyrophosphate and a metaphosphate.

With respect to a metal-air battery according to claim 3, in the metal-air battery according to claim 1 or 2, the electrolyte is an electrolytic solution or a solid electrolyte in a range from weak acidity to neutrality.

With respect to a metal-air battery according to claim 4, in the metal-air battery according to any one of claims 1 to 3, the anode is constituted by one or more of magnesium, aluminum, calcium, iron and zinc.

With respect to a metal-air battery according to claim 5, in the metal-air battery according to any one of claims 1 to 4, the nanostructure of the air electrode is a nanosheet constituted by at least one of carbon, iron oxide, manganese oxide, zinc oxide, molybdenum oxide and molybdenum sulfide, or a nanofiber constituted by at least one of carbon, iron oxide, manganese oxide, zinc oxide, molybdenum oxide, molybdenum sulfide and cellulose, and the air electrode supports a catalyst constituted by at least one metal selected from iron, manganese, zinc, copper and molybdenum, or an oxide of at least one metal selected from calcium, iron, manganese, zinc, copper and molybdenum.

In the metal-air batteries described above, the electrolyte may be constituted by an aqueous solution of any of acetic acid, sodium acetate, magnesium acetate, potassium acetate, calcium acetate, carbonic acid, sodium carbonate, magnesium carbonate, potassium carbonate, calcium carbonate, citric acid, sodium citrate, magnesium citrate, potassium citrate, calcium citrate, phosphoric acid, HEPES (4-(2-hydroxyethyl)-1-piperazineethanesulfonic acid), sodium pyrophosphate and sodium metaphosphate or of a mixture thereof.

In the metal-air batteries described above, the batteries may comprise a housing sealing the inside of the cell except for the air electrode and the housing may be constituted by a naturally degradable material.

In a method for producing the air electrode of the metal-air battery according to any one of claims 1 to 5, a method for producing an air electrode according to claim 6 comprises: a gel production step of allowing a bacterium to produce a gel in which nanofibers made of iron oxide or manganese oxide are dispersed; a freezing step of freezing the gel; and a drying step of drying the frozen body of the gel.

In a method for producing the air electrode of the metal-air battery according to any one of claims 1 to 5, a method for producing an air electrode according to claim 7 comprises: a gel production step of allowing a bacterium to produce a gel in which nanofibers made of cellulose are dispersed; a freezing step of freezing the gel; a drying step of drying the frozen body of the gel; and a carbonization step of carbonizing the co-continuous body obtained by the drying, by heating in a gas atmosphere in which the cellulose is not burned.

Effects of the Invention

As described above, according to the present invention, the air electrode is constituted by a co-continuous body having a three dimensional network structure in which a plurality of nanostructures is integrated through a noncovalent bond and the electrolyte disposed between the air electrode and the anode is constituted by a salt containing no chloride ion, and therefore, efficient utilization of electrons and suppression of passivation and self corrosion of the anode can be achieved, thereby obtaining an excellent effect that the battery performance of the metal-air battery can be improved. In addition, since the air electrode and the electrolyte are constituted by materials with a low environmental load, a metal-air battery that does not need to be recovered can be provided. In particular, since a chloride salt is not used for the electrolyte, an effect that the corrosion of the anode can be suppressed can be obtained. For example, by using a weak acidic salt or a salt with a buffering capacity for the electrolyte, an excellent effect that the pH rise in the electrolytic solution caused by the battery reaction can be suppressed and the discharge capacity can be greatly increased can be obtained.

BRIEF DESCRIPTION OF DRAWINGS

FIG. 1 is a constitutional view illustrating the configuration of a metal-air battery according to an embodiment of the present invention.

FIG. 2 is a flowchart for explaining a production method 1 according to an embodiment of the present invention.

FIG. 7 is a constitutional view illustrating the configuration of a metal-air battery according to an embodiment of the present invention.

DESCRIPTION OF EMBODIMENTS

Figure 3:
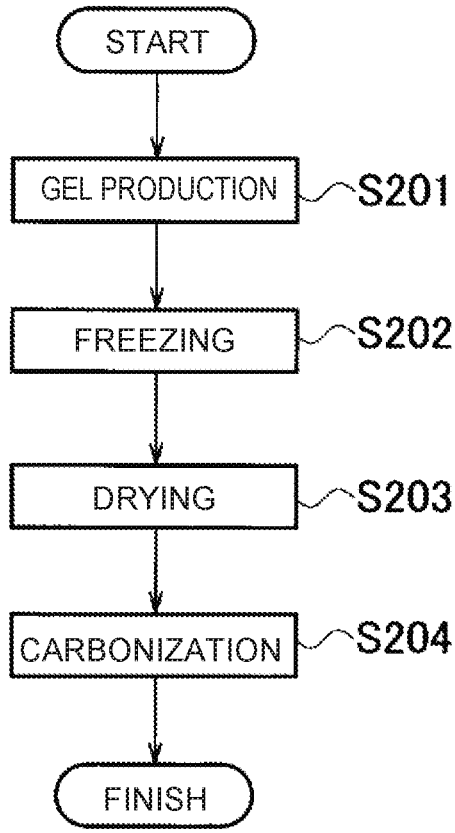
FIG. 3 is a flowchart for explaining a production method 2 according to an embodiment of the present invention.

Hereinafter, embodiments of the present invention will be described with reference to the accompanying drawings. FIG. 1 is a constitutional view illustrating the configuration of a metal-air battery according to an embodiment of the present invention.

This metal-air battery, similar to general well known metal-air batteries, uses air (oxygen) and water as the cathode active materials and a metal as the anode active material, and comprises: a gas diffusion type air electrode 101, which is the cathode; an anode 102; and an electrolyte 103 that is sandwiched between the air electrode 101 and the anode 102. One surface of the air electrode 101 is exposed to the atmosphere, and the other surface thereof is in contact with the electrolyte 103. Also, the surface of the anode 102 on the side of the electrolyte 103 is in contact with the electrolyte 103. Note that the electrolyte 103 may be either electrolytic solution or solid electrolyte. It is preferable that the electrolyte 103 should be an electrolytic solution or a solid electrolyte in a range from weak acidity to neutrality. The electrolytic solution refers to a case in which the electrolyte is in a liquid form. Also, the solid electrolyte refers to a case in which the electrolyte is in a gel form or solid form.

In the metal-air battery according to an embodiment of the present invention, the electrolyte 103 may be a substance through which metal ions and hydroxide ions can move between the air electrode 101 (the cathode) and the anode 102, and is constituted by a salt containing no chloride ion. Examples thereof may include a metal salt containing potassium or sodium, existing abundantly on the earth. Note that this metal salt may be constituted by 16 kinds of essential elements (C, O, H, N, P, K, S, Ca, Mg, Fe, Mn, B, Zn, Cu, Mo and Cl) indispensable to the growth of plants, or elements contained in sea water or rain water.

For example, the electrolyte 103 is constituted by one or more of an acetate, a carbonate, a citrate, a phosphate, HEPES (4-(2-hydroxyethyl)-1-piperazineethanesulfonic acid), a pyrophosphate and a metaphosphate. More specifically, the electrolyte may be constituted by an aqueous solution of any of acetic acid, sodium acetate, magnesium acetate, potassium acetate, calcium acetate, carbonic acid, sodium carbonate, magnesium carbonate, potassium carbonate, calcium carbonate, citric acid, sodium citrate, magnesium citrate, potassium citrate, calcium citrate, phosphoric acid, HEPES (4-(2-hydroxyethyl)-1-piperazineethanesulfonic acid), sodium pyrophosphate and sodium metaphosphate or of a mixture thereof. Magnesium not only exerts no influence even when the electrolyte leaks out into soil, but also functions as a fertilizer, and therefore, magnesium acetate, which is also used as a fertilizer, is particularly preferable.

In addition, as another material constituting the electrolyte 103, an oxide based solid electrolyte or sulfide based solid electrolyte, having ionic conductivity by which metal ions and hydroxide ions pass through the electrolyte, may be used.

Next, the anode 102 will be described. The anode 102 is constituted by an anode active material. This anode active material is not particularly limited as long as it is a material that can be used as an anode material of metal-air batteries, that is, any metal among magnesium, aluminum, calcium, iron and zinc or an alloy containing these metals as the main component. For example, the anode 102 may be constituted by a material obtained by bonding a metal, metal sheet or powder, which is to be the anode, to a metal foil such as a copper foil with pressure.

The anode 102 can be formed by a publicly known method. For example, when a magnesium metal is used as the anode 102, the anode 102 can be fabricated by piling up a plurality of metal magnesium foils and forming the piled foils into a predetermined shape.

Next, the air electrode 101 will be described. The air electrode 101 is constituted by a co-continuous body having a three dimensional network structure formed of a plurality of nanostructures integrated through a noncovalent bond. The co-continuous body is a porous body and has an integrated structure. The nanostructure is a nanosheet or nanofiber. In the co-continuous body having a three dimensional network structure in which a plurality of nanostructures is integrated through a noncovalent bond, the bonded portion between the nanostructures is deformable, providing a stretchable structure.

The nanosheet may be constituted by, for example, at least one of carbon, iron oxide, manganese oxide, zinc oxide, magnesium oxide, molybdenum oxide and molybdenum sulfide compounds. Examples of the molybdenum sulfide compound include molybdenum disulfide and phosphorus doped molybdenum sulfide. The elements of these materials may be constituted by 16 kinds of essential elements (C, O, H, N, P, K, S, Ca, Mg, Fe, Mn, B, Zn, Cu, Mo and Cl) indispensable to the growth of plants.

It is important that the nanosheet has electrical conductivity. The nanosheet is defined as a sheet-like substance having a thickness of 1 nm to 1 □m and having planar longitudinal and lateral lengths that are 100 or more times the thickness. Examples of the nanosheet made of carbon include graphene. In addition, the nanosheet may be a roll-like sheet or wave-like sheet, may be curved or bent, or may have any shape.

The nanofiber may be constituted by at least one of carbon, iron oxide, manganese oxide, zinc oxide, magnesium oxide, molybdenum oxide, molybdenum sulfide and cellulose (carbonized cellulose). The elements of these materials may be constituted by 16 kinds of essential elements (C, O, H, N, P, K, S, Ca, Mg, Fe, Mn, B, Zn, Cu, Mo and Cl) indispensable to the growth of plants.

It is important that the nanofiber also has electrical conductivity. The nanofiber is defined as a fibrous substance having a diameter of 1 nm to 1 µm and a length that is 100 or more times the diameter. In addition, the nanofiber may be a hollow fiber or coil-like fiber, or may have any shape. Note that cellulose is provided with electrical conductivity by carbonization for use, as will be mentioned later.

For example, the co-continuous body, which is to be the air electrode 101, can be fabricated by at first obtaining a frozen body by freezing a sol or gel in which the nanostructures are dispersed (a freezing step), and drying this frozen body in a vacuum (a drying step). A predetermined bacterium can produce a gel in which nanofibers made of any of iron oxide, manganese oxide, silicon and cellulose are dispersed (a gel producing step).

Also, the co-continuous body may be obtained by allowing a predetermined bacterium to produce a gel in which nanofibers made of cellulose are dispersed (a gel production step), and heating and carbonizing this gel in an inert gas atmosphere (a carbonization step).

The co-continuous body constituting the air electrode 101 has an average pore size of preferably 0.1 to 50 µm, and more preferably 0.1 to 2 µm. Here, the average pore size is a value determined by a mercury press-in method.

For the air electrode 101, it is not necessary to use an additional material, such as a binder for a case in which carbon powder is used, and this is advantageous in both cost and environmental conservation.

Here, electrode reactions in the air electrode 101 and the anode 102 will be described. In the air electrode reaction, oxygen in the air and the electrolyte come in contact with each other on the surface of the air electrode 101 having electrical conductivity, and thus a reaction indicated by "$1/2O_2+H_2O+2e^-\rightarrow 2OH^-$ . . . (1)" progresses. On the other hand, in the anode reaction, a reaction "$Me\rightarrow Me^{n+}+ne^-$ . . . (2)" (Me denotes any of the above metals and n is the valence of the above metals) progresses in the anode 102 in contact with the electrolyte 103, and the metal constituting the anode 102 releases electrons and is dissolved in the electrolyte 103 as an n-valent metal ion.

Through these reactions, discharge can be carried out. The overall reaction is "$Me+1/2O_2+H_2O\rightarrow Me(OH)_n$ . . . (3)", and this reaction produces (deposits) a hydroxide.

As described above, in the metal-air battery, the reaction indicated by the formula (1) progresses on the surface of the air electrode 101, and therefore, it is presumably favorable to generate a large amount of reaction sites inside the air electrode 101.

The cathode, air electrode 101, can be fabricated by a publicly known process such as molding carbon powder with a binder. As mentioned above, in the metal-air battery, it is important to generate a large amount of reaction sites inside the air electrode 101, and it is thus desirable that the air electrode 101 should have a large specific surface area. For example, in the present invention, the specific surface area of the co-continuous body constituting the air electrode 101 is preferably 200 $m^2/g$ % or more, and more preferably 300 $m^2/g$ or more.

When the specific surface area of a conventional air electrode fabricated by molding carbon powder with a binder into a pellet is increased, the binding strength between the carbon powder particles is decreased and the structure is deteriorated. This makes stable discharge difficult and the discharge capacity is decreased.

In contrast, according to the air electrode 101 of the present invention, constituted by the co-continuous body having a three dimensional network structure in which a plurality of nanostructures is integrated through a noncovalent bond as mentioned above, the conventional problems mentioned above can be solved and the discharge capacity can be increased.

Also, the air electrode 101 may support a catalyst. The catalyst may be constituted by at least one metal among iron, manganese, zinc, copper and molybdenum, or a metal oxide formed of at least one metal among calcium, iron, manganese, zinc, copper and molybdenum. Note that the elements of these materials may be constituted by metals included in 16 kinds of essential elements indispensable to the growth of plants, and may have catalytic ability. As the metal, iron, manganese and zinc are preferable, and an oxide formed of one of these metals or a complex oxide formed of two or more of these metals is preferable. In addition, manganese oxide ($MnO_2$) is particularly suitable. Manganese oxide is preferable because it exhibits particularly excellent catalytic performance in the present invention.

In addition, it is also preferable that the metal oxide, which is to be the catalyst, should be an amorphous hydrate. For example, it may be a hydrate of the transition metal oxide mentioned above. More specifically, it may be a manganese oxide (IV)-m hydrate. Note that m is the number of moles of $H_2O$ based on 1 mol of $MnO_2$. Excellent battery performance can be obtained by allowing the surface of the co-continuous body constituting the air electrode 101 to support the manganese oxide hydrate as nanosized fine particles in a highly dispersed state.

For example, excellent battery performance can be exhibited by using, as the air electrode 101, the co-continuous body of the air electrode 101 onto which a manganese oxide hydrate ($MnO_2.mH_2O$) is highly dispersed and attached (added) as nanosized fine particles. The content of the catalyst contained in the air electrode 101 is 0.1 to 70% by weight, and is preferably 1 to 30% by weight based on the total weight of the air electrode 101. The battery performance is greatly improved when a transition metal oxide is added as the catalyst to the air electrode 101. An electrolytic solution of the electrolyte 103 permeates through the air electrode 101, and an oxygen gas in the atmosphere is supplied at the same time, thereby forming a triphasic interface of electrolytic solution-electrode-gas (oxygen) as mentioned above. If the catalyst is highly active in this triphasic interface site, oxygen reduction (discharge) on the electrode surface smoothly progresses, and the battery performance is greatly improved.

Since the interaction between such a catalyst and oxygen, which is the cathode active material, is strong, the catalyst can adsorb many oxygen species onto its surface or can occlude oxygen species in oxygen vacancies.

As described above, the oxygen species adsorbed onto the surface of the metal oxide constituting the catalyst or occluded in the oxygen vacancies are used in an oxygen reduction reaction as the oxygen source (an active intermediate reactant) of the above formula (1), and the above reaction readily progresses. As described above, the metal oxide such as manganese oxide effectively functions as the catalyst. Instead of such a metal oxide, a metal itself can also be used as the catalyst, and the metal functions in the same manner as the above metal oxide.

In the metal-air battery, as mentioned above, it is desirable that the reaction sites [the triphasic portions of electrolytic solution/electrode/air (oxygen) described above], which cause the electrode reaction, should be present as many as possible in order to increase the battery efficiency. From such a viewpoint, it is important that a large amount of the triphasic portions mentioned above is also present on the surface of the catalyst, and it is preferable that the specific surface area of the catalyst should be large. The specific surface area of the catalyst made of a metal or metal oxide may be 0.1 to 1,000 $m^2/g$, and preferably 1 to 500 $m^2/g$. Note that the specific surface area is obtained by a publicly known BET method using $N_2$ adsorption.

The air electrode 101 to which the catalyst is added can be produced by a method for producing the air electrode 101 of the metal-air battery, which will be mentioned later.

Note that, in addition to the configuration described above, the metal-air battery can include structural members such as a separator, a battery case and a metal mesh (for example, a copper mesh), and elements required for the metal-air battery. For these members and elements, those that are conventionally and publicly known can be used. The separator is not particularly limited as long as it is a fibrous material, but a cellulose based separator made from plant fibers or bacteria is particularly preferable.

Next, a method for producing a metal-air battery will be described. The metal-air battery of the present invention can be fabricated by appropriately arranging the air electrode 101 obtained by a method for producing an air electrode, which will be mentioned later, the anode 102 and the electrolyte 103, together with other necessary elements based on the structure of a desired metal-air battery, in an appropriate container such as a case. For these production procedures for the metal-air battery, a conventionally known method can be applied.

Production Method

Hereinafter, a method for producing the air electrode 101 will be described.

Production Method 1

At first, a production method 1 will be described with reference to FIG. 2. FIG. 2 is a flow chart for describing the production method 1. At first, in a step S101, a frozen body is obtained by freezing a sol or gel in which nanostructures such as nanosheets or nanofibers are dispersed (a freezing step). Next, in a step S102, a co-continuous body is obtained by drying the obtained frozen body in a vacuum (a drying step).

Hereinafter, more detailed description will be given for each step. The freezing step of the step S101 is a step of maintaining or constructing a three dimensional network structure by using a plurality of nanostructures as the raw material of a stretchable co-continuous body having the three dimensional network structure formed of the nanostructures integrated through a noncovalent bond.

Here, the gel means a solid dispersion medium having lost fluidity due to the three dimensional network structure of the nanostructures, which are the dispersoids. Specifically, the gel means a dispersion system having a shear elastic modulus of $10^2$ to $10^6$ Pa. The dispersion medium of the gel may be an aqueous medium such as water ($H_2O$), or an organic medium such as a carboxylic acid, methanol ($CH_3OH$), ethanol ($C_2H_5OH$), propanol ($C_3H_7OH$), n-butanol, isobutanol, n-butylamine, dodecane, an unsaturated fatty acid, ethylene glycol, heptane, hexadecane, isoamyl alcohol, octanol, isopropanol, acetone or glycerin, and two or more kinds thereof may be mixed.

Next, the sol means a colloid formed of a dispersion medium and the nanostructures, which are the dispersoids. Specifically, the sol means a dispersion system having a shear elastic modulus of 1 Pa or less. The dispersion medium of the sol may be an aqueous medium such as water, or an organic medium such as a carboxylic acid, methanol, ethanol, propanol, n-butanol, isobutanol, n-butylamine, dodecane, an unsaturated fatty acid, ethylene glycol, heptane, hexadecane, isoamyl alcohol, octanol, isopropanol, acetone or glycerin, and two or more kinds thereof may be mixed.

The freezing step is performed by, for example, accommodating the sol or gel in which the nanostructures are dispersed in an appropriate container such as a test tube, and cooling the surrounding of the test tube in a coolant such as liquid nitrogen, thereby freezing the sol or gel accommodated in the test tube. The approach of freezing is not particularly limited as long as the dispersion medium of the gel or sol can be cooled to the freezing point or lower, and the dispersion medium may also be cooled with a freezer or the like.

By freezing the gel or sol, the dispersion medium loses fluidity and the dispersoids are fixed, thereby constructing the three dimensional network structure. Also, in the freezing step, the specific surface area can be adjusted freely by adjusting the concentration of the gel or sol, and the specific surface area of the obtained co-continuous body is increased as the concentration of the gel or sol is decreased. If the concentration becomes 0.01% by weight or less, however, it becomes difficult for the dispersoids to construct the three dimensional network structure. Therefore, it is suitable that the concentration of the dispersoids should be 0.01 to 10% by weight.

By constructing the three dimensional network structure having a large specific surface area with the nanostructures such as nanofibers or nanosheets, this structure has excellent stretchability when compressed or extended because the pores play the role of a cushion. Specifically, the co-continuous body desirably has a distortion of 5% or more, and more desirably 10% or more at the elastic limit.

If the dispersoids are not fixed by freezing, the dispersoids are aggregated along with the evaporation of the dispersion medium in the subsequent drying step, and therefore, a sufficiently high specific surface area cannot be obtained and it becomes difficult to fabricate the co-continuous body having the three dimensional network structure.

Next, the drying step of the step S102 will be described. The drying step is a step of, from the frozen body obtained in the freezing step, taking the dispersoids (a plurality of microstructures that have been integrated) maintaining or constructing the three dimensional network structure out of the dispersion medium.

In the drying step, the frozen body obtained in the freezing step is dried in a vacuum, thereby sublimating the frozen dispersion medium from the solid state. For example, the drying step is performed by accommodating the obtained frozen body in an appropriate container such as a flask, and evacuating the inside of the container. Since the frozen body is placed in the vacuum atmosphere, the sublimation point of the dispersion medium is lowered, and this allows even a substance that is not sublimated at ordinary pressure to be sublimated.

The degree of vacuum in the drying step varies depending on the dispersion medium to be used, and is not particularly limited as long as it enables sublimation of the dispersion medium. For example, when water is used as the dispersion medium, the degree of vacuum must be set such that the pressure is 0.06 MPa or less, but the drying time is prolonged because heat is deprived of as latent heat of sublimation. For this reason, it is suitable that the degree of vacuum should be $1.0 \times 10^{-6}$ to $1.0 \times 10^{-2}$ Pa. Furthermore, upon the drying, heat may also be applied by using a heater or the like.

In a method for performing drying in the atmosphere, the state of the dispersion medium is changed from solid to liquid, and subsequently from liquid to gaseous, and therefore, the frozen body is changed into a liquid state and becomes fluidic again in the dispersion medium, thereby demolishing the three dimensional network structure of a plurality of nanostructures. For this reason, it is difficult for the drying in the atmospheric pressure atmosphere to fabricate a stretchable co-continuous body.

Production Method 2

Next, a production method 2 will be described with reference to FIG. 3. FIG. 3 is a flow chart for describing the production method 2.

At first, in a step S201, a gel in which nanofibers made of any of iron oxide, manganese oxide and cellulose are dispersed is produced by a predetermined bacterium (a gel producing step). By using the gel thus obtained, a co-continuous body is fabricated.

The gel produced by a bacterium has a nm-order fiber as a basic structure, and by using this gel to fabricate a co-continuous body, the co-continuous body to be obtained will have a large specific surface area. As mentioned above, it is desirable that the air electrode of the metal-air battery should have a large specific surface area, and therefore, it is suitable to use the gel produced by a bacterium. Specifically, by using the gel produced by a bacterium, an air electrode (co-continuous body) having a specific surface area of 300 $m^2/g$ or more can be synthesized.

The gel produced by a bacterium has a structure in which fibers get entangled into the form of a coil or mesh, and further has a structure in which nanofibers branch based on the proliferation of the bacterium, and therefore, in a co-continuous body that can be fabricated, excellent stretchability with a distortion of 50% or more at the elastic limit is accomplished. Accordingly, a co-continuous body fabricated by using the gel produced by a bacterium is suitable for the air electrode of the metal-air battery.

As the gel produced by a bacterium, two or more of bacterial cellulose, iron oxide and manganese oxide may be mixed.

Examples of the bacterium include those publicly known, and it may be, for example, an *Acetobacter* such as *Acetobacter xylinum* subspecies *sucrofermentans*, *Acetobacter xylinum* ATCC23768, *Acetobacter xylinum* ATCC23769, *Acetobacter pasteurianus* ATCC10245, *Acetobacter xylinum* ATCC14851, *Acetobacter xylinum* ATCC11142 and *Acetobacter xylinum* ATCC10821, *Agrobacterium*, *Rhizobium*, *Sarcina*, *Pseudomonas*, *Achromobacter*, *Alcaligenes*, *Aerobacter*, *Azotobacter*, *Zooglea*, *Enterobacter*, *Kluyvera*, *Leptothrix*, *Gallionella*, *Siderocapsa*, *Thiobacillus*, and those produced by culturing various mutant strains created by subjecting the above bacteria to a mutation treatment by a publicly known method using NTG (nitrosoguanidine) or the like.

As a method in which a co-continuous body is obtained by using a gel produced by the bacterium mentioned above, in the same manner as the production method 1, a frozen body may be obtained by freezing the gel in a step S202 (a freezing step) and the frozen body may be dried in a vacuum to obtain a co-continuous body in a step S203 (a drying step). However, when using a gel in which nanofibers made of cellulose produced by a bacterium are dispersed, in a step S204, the co-continuous body thus fabricated is carbonized by heating in a gas atmosphere in which the cellulose is not burned (a carbonization step).

The bacterial cellulose, which is a component contained in the gel produced by a bacterium, has no electrical conductivity. Therefore, when using it as the air electrode, the carbonization step of carbonizing the co-continuous body by subjecting it to a heat treatment in an inert gas atmosphere, thereby imparting electrical conductivity is important. The co-continuous body thus carbonized has high electrical conductivity, corrosion resistance, high stretchability and large specific surface area, and hence is suitable as the air electrode of the metal-air battery.

In carbonization of a bacterial cellulose, the carbonization may be performed by synthesizing a co-continuous body having a three dimensional network structure formed of the bacterial cellulose in the freezing step and drying step mentioned above, and subsequently calcining the co-continuous body in an inert gas atmosphere at 500° C. to 2000° C., and more preferably 900° C. to 1800° C. The gas that does not burn the cellulose may be an inert gas such as nitrogen gas or argon gas. Alternatively, the gas may be a reducing gas such as hydrogen gas or carbon monoxide gas, or may be carbon dioxide gas. In the present invention, it is more preferable to use carbon dioxide gas or carbon monoxide gas having an activation effect to a carbon material and expectedly capable of highly activating the co-continuous body.

Production Method 3

Figure 4:
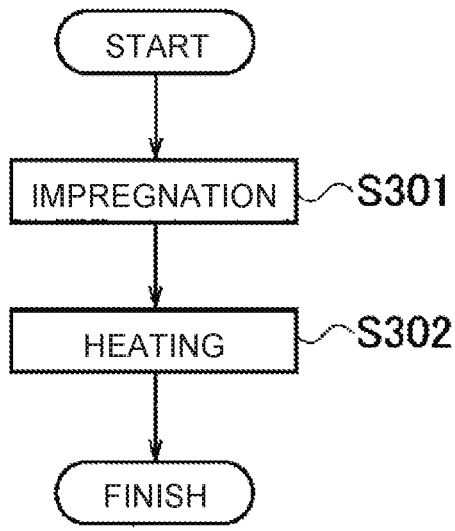
FIG. 4 is a flowchart for explaining a production method 3 according to an embodiment of the present invention.

Next, a production method 3 will be described with reference to FIG. 4. FIG. 4 is a flow chart for describing the production method 3. As mentioned above, a catalyst may be supported on the air electrode. In a step S301, the co-continuous body obtained by the production method 1 or production method 2 mentioned above is impregnated with an aqueous solution of a metal salt, which is to be a precursor of a catalyst (an impregnation step). After a stretchable co-continuous body containing the metal salt is prepared as such, the stretchable co-continuous body containing the metal salt may be subjected to a heating treatment in a step S302 (a heating step). Note that the metal in the metal salt to be used is preferably at least one metal selected from the group consisting of iron, manganese, zinc, copper and molybdenum. Manganese is particularly preferable.

In order to allow the co-continuous body to support a transition metal oxide, a conventionally known method can be used. For example, mention may be made of a method in which the co-continuous body is impregnated with an aqueous solution of a transition metal chloride or transition metal nitrate, the solution is evaporated to dryness, and the co-continuous body is then subjected to hydrothermal synthesis in water ($H_2O$) at high temperature and high pressure. Mention may also be made of a sedimentation method in which the co-continuous body is impregnated with an aqueous solution of a transition metal chloride or transition metal nitrate and an aqueous alkaline solution is dropped thereonto. In addition, mention may also be made of a sol-gel method in which the co-continuous body is impregnated with a transition metal alkoxide solution and then subjected to hydrolysis. The conditions for each of these liquid phase methods are publicly known, and these publicly known conditions can be applied. In the present invention, the liquid phase methods are desirable.

A metal oxide to be supported according to the liquid phase methods described above is in an amorphous state in many cases because crystallization has not progressed. By subjecting the amorphous precursor to a heat treatment at a high temperature of about 500° C. in an inert atmosphere, a crystalline metal oxide can be obtained. Such a crystalline metal oxide exhibits high performance even when used as the catalyst on the air electrode.

On the other hand, precursor powder to be obtained when drying the amorphous precursor described above at a relatively low temperature of about 100 to 200° C. is in a hydrate state while maintaining the amorphous state. The hydrate of the metal oxide can be formally represented by $Me_xO_y \cdot nH_2O$ (where Me denotes any of the above metals; x and y represent the number of metals and the number of oxygens contained in the metal oxide molecule, respectively; and n is the number of moles of $H_2O$ based on 1 mol of the metal oxide). The hydrate of the metal oxide obtained by such low temperature drying can be used as the catalyst.

The amorphous metal oxide (hydrate) has hardly been sintered, and hence has a large surface area and exhibits a very small particle size of about 30 nm. These characteristics are suitable as the catalyst, and by using such an amorphous metal oxide, excellent battery performance can be obtained.

As mentioned above, a crystalline metal oxide exhibits high activity, but for the metal oxide that has been crystallized through a heat treatment at a high temperature as described above, the surface area thereof may be reduced significantly and the particle size thereof may also become about 100 nm due to aggregation of the particles. Note that this particle size (average particle size) is a value obtained by measuring the diameters of particles in a 10 μm square area (10 μm×10 μm) by observing the particles in an enlarged scale using a scanning electron microscope (SEM) or the like, and calculating the average value thereof.

Also, especially in a catalyst made of a metal oxide that has been subjected to a heat treatment at a high temperature, the particles are aggregated, and therefore, it may be difficult to add the catalyst onto the surface of the co-continuous body in a highly dispersed state. In order to obtain a sufficient catalytic effect, it may be necessary to add a large amount of the metal oxide into the air electrode (co-continuous body), and it may be disadvantageous in cost to fabricate the catalyst through a heat treatment at a high temperature.

In order to solve this problem, the following production method 4, production method 5 and production method 6 may be used.

Production Method 4

Figure 5:
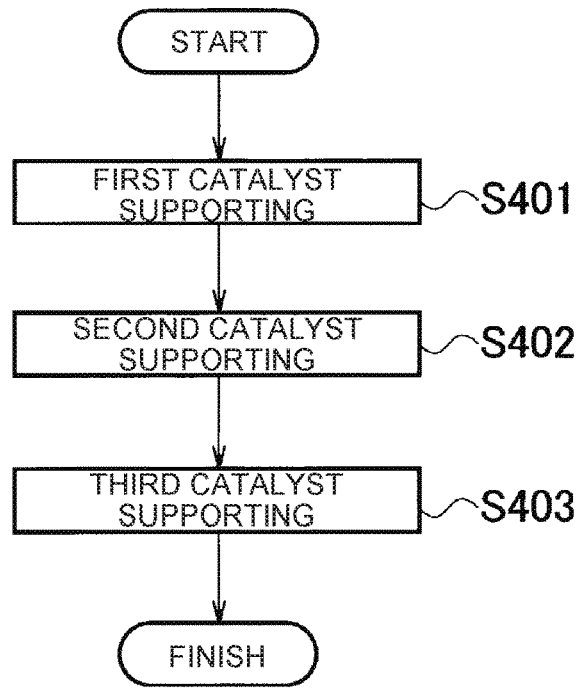
FIG. 5 is a flowchart for explaining a production method 4 according to an embodiment of the present invention.

Next, a production method 4 will be described with reference to FIG. 5. FIG. 5 is a flow chart for describing the production method 4.

In the production method 4, the co-continuous body fabricated in the production method 1 and the production method 2 is allowed to support a catalyst. In the production method 4, in addition to the production of the co-continuous body mentioned above, the following catalyst supporting step is added in which the co-continuous body is allowed to support a catalyst.

At first, in a first catalyst supporting step of a step S401, the co-continuous body is immersed in an aqueous solution of a surfactant to attach the surfactant on the surface of the co-continuous body.

Next, in a second catalyst supporting step of a step S402, by using an aqueous solution of a metal salt, on the surface of the co-continuous body on which the surfactant has been attached, the metal salt is attached via the surfactant.

Next, in a third catalyst supporting step of a step S403, through a heat treatment for the co-continuous body to which the metal salt has been attached, the co-continuous body is allowed to support a catalyst formed of the metal constituting the metal salt or an oxide of the metal.

Note that the metal described above is at least one metal among iron, manganese, zinc, copper and molybdenum, or a metal oxide formed of at least one metal among calcium, iron, manganese, zinc, copper and molybdenum. Mn or manganese oxide ($MnO_2$) is particularly preferable.

The surfactant to be used in the first catalyst supporting step of the production method 4 is for allowing the air electrode (co-continuous body) to support a metal or transition metal oxide thereon in a highly dispersed state. As long as a molecule has a hydrophobic group that is adsorbed onto the carbon surface and a hydrophilic group that adsorbs transition metal ions, like the surfactant, metal ions as the transition metal oxide precursor are allowed to be adsorbed onto the co-continuous body in a highly dispersed state.

The surfactant mentioned above is not particularly limited as long as a molecule has a hydrophobic group that is adsorbed onto the carbon surface and a hydrophilic group that adsorbs manganese ions, but a nonionic surfactant is preferable. For example, as an ester type surfactant, mention may be made of glycerin laurate, glycerin monostearate, sorbitan fatty acid ester, sucrose fatty acid ester and the like. In addition, as an ether type surfactant, mention may be made of polyoxyethylene alkyl ether, polyoxyethylene alkylphenyl ether, polyoxyethylene polyoxypropylene glycol and the like.

Moreover, as an ester ether type surfactant, mention may be made of polyoxyethylene sorbitan fatty acid ester, polyoxyethylene hexytan fatty acid ester, sorbitan fatty acid ester polyethylene glycol and the like. In addition, as an alkanol amide type surfactant, mention may be made of lauramide, cocamide DEA and the like. Also, as a higher alcohol surfactant, mention may be made of cetanol, stearyl alcohol, oleyl alcohol and the like. Furthermore, as a poloxamer type surfactant, mention may be made of poloxamer dimethacrylate and the like.

The concentration of the aqueous surfactant solution in the first catalyst supporting step of the production method 4 is preferably 0.1 to 20 g/L. In addition, the immersion conditions such as the immersion time and immersion temperature include, for example, immersing the co-continuous body in a solution at room temperature to 50°C for 1 to 48 hours.

The second catalyst supporting step of the production method 4 includes further dissolving a metal salt that functions as a catalyst in the aqueous solution containing the surfactant in the first catalyst supporting step, or adding an aqueous solution of the metal salt thereto. Alternatively, apart from the aqueous solution containing the surfactant mentioned above, an aqueous solution in which a metal salt that functions as a catalyst is dissolved may be prepared, and the co-continuous body impregnated with the surfactant (to which the surfactant has been attached) may be immersed in this solution.

Also, the co-continuous body to which the surfactant has been attached may be impregnated with an aqueous solution in which a metal salt is dissolved. As necessary, an aqueous alkaline solution may be dropped on the obtained co-continuous body containing the metal salt (to which the metal salt has been attached). By doing the above, the metal or metal oxide precursor can be attached to the co-continuous body.

It is preferable that the amount of the metal salt added in the second catalyst supporting step of the production method 4 should be 0.1 to 100 mmol/L. In addition, the immersion conditions such as the immersion time and immersion temperature include, for example, immersing the co-continuous body in a solution at room temperature to 50°C for 1 to 48 hours.

More specifically, if explanation is given by taking manganese as an example of the metal, for example, a manganese metal salt (for example, a manganese halide such as manganese chloride or its hydrate) is added to an aqueous solution that contains the surfactant and with which the co-continuous body is impregnated. Subsequently, by dropping an aqueous alkaline solution on the obtained co-continuous body containing the manganese metal salt, manganese hydroxide as a metal or metal oxide precursor is allowed to be supported on the co-continuous body.

The amount of the above-mentioned catalyst made of manganese oxide to be supported can be adjusted by the concentration of the metal salt (for example, manganese chloride) in the aqueous metal salt solution.

In addition, examples of the alkali to be used in the aqueous alkaline solution mentioned above may include a hydroxide of an alkali metal or alkali earth metal, aqueous ammonia, an aqueous ammonium solution, and an aqueous tetramethylammonium hydroxide (TMAH) solution. It is preferable that the concentration of these aqueous alkaline solutions should be 0.1 to 10 mol/L.

In the third catalyst supporting step in the production method 4, the metal or metal oxide precursor (metal salt), which has been attached to the surface of the co-continuous body, is converted into the metal itself or the metal oxide through a heat treatment.

Specifically, the co-continuous body to which the precursor has been attached may be dried at room temperature (about 25° C.) to 150° C., and more preferably 50° C. to 100° C. for 1 to 24 hours, and then subjected to a heat treatment at 100 to 600° C., and preferably 110 to 300° C.

In the third catalyst supporting step in the production method 4, by subjecting the co-continuous body to a heat treatment in an inert atmosphere such as argon, helium and nitrogen or in a reducing atmosphere, an air electrode made of a co-continuous body, to the surface of which the metal itself is attached as a catalyst, can be produced. Also, an air electrode made of a co-continuous body, to the surface of which the metal oxide is attached as a catalyst, can be produced by subjecting the co-continuous body to a heat treatment in gas containing an oxygen (oxidizing atmosphere).

Also, by subjecting the co-continuous body to a heat treatment under the reducing conditions mentioned above, a co-continuous body to which the metal itself is attached as a catalyst is once fabricated, and then by subjecting this to a heat treatment in an oxidizing atmosphere, an air electrode made of a co-continuous body to which the metal oxide is attached as a catalyst can be produced.

As an alternative method, by drying the co-continuous body to which the metal or metal oxide precursor (metal salt) has been attached at room temperature to 150° C., more preferably 50° C. to 100° C., allowing the metal itself to be attached onto the co-continuous body as a catalyst, a metal/co-continuous body composite may be fabricated.

In the production method 4, the amount (content) of the attached catalyst made of the metal or metal oxide is 0.1 to 70% by weight, and is preferably 1 to 30% by weight based on the total weight of the co-continuous body and the catalyst.

According to the production method 4, an air electrode in which the catalyst made of the metal or metal oxide is highly dispersed on the surface of the co-continuous body can be produced, and a metal-air battery with excellent electrical characteristics can be configured.

Production Method 5

Next, a production method 5 will be described. In the production method 5, the co-continuous body fabricated in the production method 1 and the production method 2 is allowed to support a catalyst according to a method different from the production method 4 mentioned above. In the production method 5, in addition to the production of the co-continuous body mentioned above, the following catalyst supporting step is added in which the co-continuous body is allowed to support a catalyst.

In a first catalyst supporting step, by immersing the co-continuous body in an aqueous solution of a metal salt, the metal salt is attached to the surface of the co-continuous body.

Next, in a second catalyst supporting step, through a heat treatment for the co-continuous body to which the metal salt has been attached, the co-continuous body is allowed to support a catalyst formed of the metal constituting the metal salt.

Next, in a third catalyst supporting step, by subjecting the co-continuous body on which the catalyst is supported to water at high temperature and high pressure, the catalyst is changed into a metal oxide hydrate.

Note that the metal described above is at least one metal among iron, manganese, zinc, copper and molybdenum, or a metal oxide formed of at least one metal among calcium, iron, manganese, zinc, copper and molybdenum. Mn or manganese oxide ($MnO_2$) is particularly preferable.

In the first catalyst supporting step in the production method 5, an aqueous solution of a metal salt, a metal or metal oxide precursor, which is ultimately to be a catalyst, is allowed to be attached (supported) on the surface of the co-continuous body. For example, an aqueous solution in which the metal salt described above is dissolved may be separately prepared, and the co-continuous body may be impregnated with this aqueous solution. The impregnation conditions and the like are the same as the conventional conditions as mentioned above.

The second catalyst supporting step in the production method 5 is the same as the third catalyst supporting step of the production method 2, and a heating treatment may be performed in an inert atmosphere or reducing atmosphere. Also, as described as the alternative method of the third catalyst supporting step of the production method 2, by subjecting the co-continuous body to which the precursor has been attached to a heating treatment (drying) at low temperature (room temperature to 150° C., more preferably 50° C. to 100° C.), the metal may be attached to the co-continuous body.

The air electrode 101 using a metal itself as a catalyst exhibits high activity, but may be weak against corrosion lack long term stability because the catalyst is a metal. In contrast, by changing the metal into a metal oxide hydrate through a heating treatment according to a third catalyst supporting step of the production method 5, which will be described in detail below, long term stability can be achieved.

In the third catalyst supporting step of the production method 5, the metal oxide hydrate is attached to the co-continuous body. Specifically, the co-continuous body obtained in the second catalyst supporting step of the production method 5, to which the metal has been attached, is immersed in water at high temperature and high pressure, thereby converting the attached metal into a catalyst formed of the metal oxide hydrate.

For example, the co-continuous body, to which the metal has been attached, may be immersed in water at 100° C. to 250° C., and more preferably 150° C. to 200° C., thereby oxidizing the attached metal into the metal oxide hydrate.

Since the boiling point of water at atmospheric pressure (0.1 MPa) is 100□C, normally, nothing can be immersed in water at 100° C. or higher at atmospheric pressure. However, by using a predetermined airtight container and elevating the internal pressure of this airtight container to, for example, 10 to 50 MPa, and preferably about 25 MPa, the boiling point of water rises in the airtight container, and liquid water at 100° C. to 250° C. can be achieved. When the co-continuous body to which the metal has been attached is immersed in the water at high temperature thus obtained, the metal can be changed into the metal oxide hydrate.

Production Method 6

Next, a production method 6 will be described. In the production method 6, the co-continuous body fabricated in the production method 1 and the production method 2 is allowed to support a catalyst according to a method different from the production method 4 and the production method 5 mentioned above. In the production method 6, in addition to the production of the co-continuous body mentioned above, the following catalyst supporting step is added in which the co-continuous body is allowed to support a catalyst.

In a first catalyst supporting step, by immersing the co-continuous body in an aqueous solution of a metal salt, the metal salt is attached to the surface of the co-continuous body.

Next, in a second catalyst supporting step, by subjecting the co-continuous body to which the metal salt has been attached to water at high temperature and high pressure, the co-continuous body is allowed to support a catalyst formed of a metal oxide hydrate made of the metal constituting the metal salt.

Note that the metal described above may be at least one metal among iron, manganese, zinc, copper and molybdenum.

The first catalyst supporting step in the production method 6 is the same as the first catalyst supporting step in the production method 5, and description will thus be omitted.

In the second catalyst supporting step in the production method 6, the precursor (metal salt) that has been attached to the surface of the co-continuous body is converted into the metal oxide hydrate through a heat treatment at a relatively low temperature.

Specifically, the co-continuous body, to which the precursor has been attached, is subjected to water at high temperature and high pressure, and then dried at a relatively low temperature of about 100 to 200□C. Consequently, the precursor is changed into a hydrate in which water molecules are present in particles, while maintaining the amorphous state of the precursor. The metal oxide hydrate obtained by such drying at low temperature is used as a catalyst.

In an air electrode fabricated according to the production method 6, the metal oxide hydrate can be supported in a highly dispersed state on the co-continuous body as nano-sized fine particles. Accordingly, when such a co-continuous body is used as an air electrode, excellent battery performance can be exhibited.

The co-continuous body obtained by each of the production methods described above can be molded into a predetermined shape by a publicly known procedure for use as an air electrode. For example, a co-continuous body that has not supported a catalyst yet or that has supported a catalyst may be processed into the form of a plate or sheet, and the obtained co-continuous body may be cut into a circular shape having a desired diameter (for example, 23 mm) by using a punching blade, laser cutter or the like, thereby obtaining an air electrode.

EXAMPLES

Figure 6A:
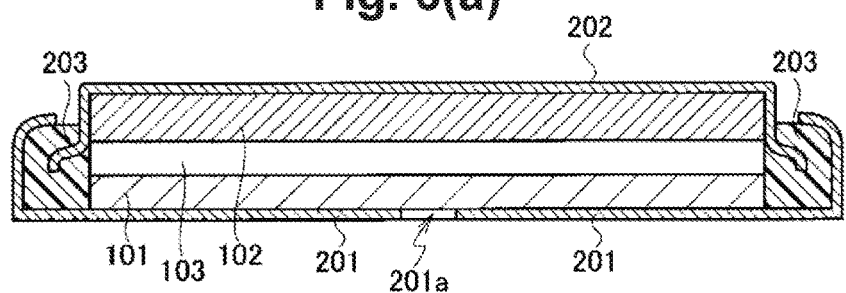
FIG. 6 is a cross-sectional view and a top plan view illustrating a more detailed configuration example of a coin cell type metal-air battery according to an embodiment of the present invention.
Figure 6B:
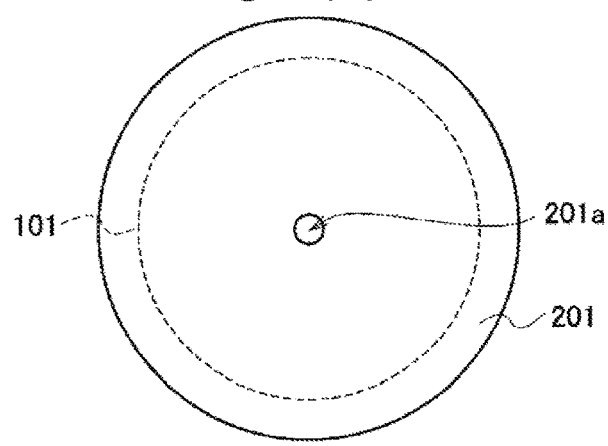

Hereinafter, more detailed description will be given using Examples. At first, the configuration of a battery that was actually used will be described with reference to FIG. 6. FIG. 6(*a*) is a cross-sectional view illustrating a more detailed configuration example of a coin cell type metal-air battery. In addition, FIG. 6(*b*) is a top plan view illustrating a configuration example of the coin cell type metal-air battery. FIG. 6(*b*) is an external view of the metal-air battery of FIG. 6(*a*), viewed from the bottom to the top. However, the overall size is scaled down due to the finite surface limitations of the page space.

A battery using the air electrode 101, anode 102 and electrolyte 103 according to the embodiment mentioned above can be fabricated with a conventional shape such as a coin shape, cylindrical shape and laminate shape. For producing these batteries, a method that is the same as the conventional method can be used.

As illustrated in FIG. 6, a coin cell type battery comprises the air electrode 101 and the anode 102, as well as the electrolyte 103 therebetween. The electrolyte 103 is a sheet-like separator impregnated with an electrolytic solution. Also, an air electrode case 201 is arranged on the side of the air electrode 101, and an anode case 202 is arranged on the side of the anode 102. The air electrode case 201 comprises an opening 201a at the center of the case such that the ambient air can come in contact with the air electrode 101.

In addition, the air electrode case 201 and the anode case 202 are fitted with each other by using a caulking machine, and a gasket 203 is arranged in the fitted portion. A battery cell is obtained by sandwiching the electrolyte 103 between the air electrode 101 and the anode 102. This battery cell is arranged between the air electrode case 201 and the anode case 202, and the air electrode case 201 and the anode case 202 are integrated by fitting.

Alternatively, as illustrated in FIG. 7, by using a housing 300 that seals the inside of the battery cell except for a portion of the air electrode 101, the battery cell may be accommodated in the housing 300. The housing 300 is constituted by a first housing 311 arranged on the side of the anode 102 and a second housing 312 arranged on the side of the air electrode 101. An opening 312a is formed in the second housing 312 such that the ambient air can come in contact with the air electrode 101. Also, an anode current collector 301 is provided between the first housing 311 and the anode 102, a cathode current collector 302 is provided between the second housing 312 and the air electrode 101, and a terminal 321 or 322 is extracted outside the housing 300 from each of these current collectors. Note that, when using a metal as the anode 102, the terminal may also be extracted outside directly from the anode 102 without using the anode current collector 301.

In a metal-air battery with the configuration mentioned above, the electrolyte 103 may be constituted by a sheet of a water absorbing insulator such as a coffee filter, kitchen paper or filter paper. As the electrolyte 103, it is particularly preferable to use a sheet of a naturally degradable material such as a cellulose based separator made from plant fibers.

In addition, the housing 300 may be constituted by a naturally degradable material that can hold the battery cell inside. The housing 300 may be made from any of a natural product based material, a microorganism based material and a chemosynthetic material. For example, the housing 300 can be constituted by a polylactic acid, a polycaprolactone, a polyhydroxyalkanoate, a polyglycolic acid, a modified polyvinyl alcohol, a casein, a modified starch or the like. A chemosynthetic material such as a polylactic acid derived from plants is particularly favorable. In addition, the shape of the housing 300 is not limited as long as it can be obtained by processing a biodegradable plastic. One example of the material applicable to the housing 300 is a commercially available biodegradable plastic film. In addition, a paper on which a coating film of a resin such as a polyethylene is formed, used for a milk pack and the like, and an agar film can also be used.

The inside of the battery cell except for a portion of the air electrode 101 can be sealed by bonding the first housing 311 and the second housing 312, both constituted by the material mentioned above, at their peripheries. Examples of the bonding method include, without particular limitations, heat sealing and the use of an adhesive. It is preferable to use an adhesive constituted by a biodegradable resin. Note that the shapes of the air electrode 101, the anode 102, the electrolyte 103, the first housing 311, the second housing 312, the anode current collector 301 and the cathode current collector 302 are not limited as long as the arrangement of these components for operating as a battery is not impaired. For example, these components can be used as a rectangular or circular sheet shape in a planar view, or as a rolled shape.

The metal-air battery using the housing 300 constituted by the naturally degradable material mentioned above is naturally degraded over time when used in a disposable device such as a soil moisture sensor, and hence does not need to be recovered. Also, since the battery is constituted by a nature derived material or fertilizer component, the load on the environment is extremely low. There is no need to recover the battery when it is used not only in soil but also in the natural world such as forest and ocean. In addition, when used in an ordinary living environment, the battery can be disposed as burnable waste.

Example 1

At first, Example 1 will be described. Example 1 is an example in which a co-continuous body having a three dimensional network structure formed of a plurality of nanosheets integrated through a noncovalent bond is used as an air electrode. The air electrode was synthesized as follows. In the following description, a production method using graphene as nanosheets will be shown as a typical example, but the co-continuous body having a three dimensional network structure can be adjusted by changing the material of the nanosheets from graphene to another material. Note that the porosity shown below was calculated from the pore size distribution obtained by performing a mercury press-in method on the co-continuous body, modeling pores as a cylindrical shape.

At first, a commercially available graphene sol [a dispersion medium: water ($H_2O$), 0.4% by weight, silicon manufactured by Sigma-Aldrich] was placed in a test tube, and this test tube was dipped in liquid nitrogen for 30 minutes to completely freeze the graphene sol. After completely freezing the graphene sol, the frozen graphene sol was taken out into an eggplant shaped flask and dried in a vacuum of 10 Pa or less by using a freeze drying machine (manufactured by TOKYO RIKAKIKAI CO., LTD.), thereby obtaining a stretchable co-continuous body having a three dimensional network structure including graphene nanosheets.

The obtained co-continuous body was evaluated by performing X-ray diffraction (XRD) measurement, scanning electron microscope (SEM) observation, porosity measurement, a tension test, and BET specific surface area measurement. The co-continuous body fabricated in the present invention was confirmed to be a carbon (C, PDF card No. 01-075-0444) single phase through the XRD measurement. Note that the PDF card No. is the card number of the PDF (Powder Diffraction File), which is a database collected by ICDD (International Centre for Diffraction Data), and the same applies hereinafter.

It was also confirmed through the SEM observation and the mercury press-in method that the obtained co-continuous body is a co-continuous body in which the nanosheets (graphene pieces) continuously range and the average pore size is 1 μm. In addition, when the BET specific surface area of the co-continuous body was measured through the mercury press-in method, it was found to be 510 $m^2/g$. Also, when the porosity of the co-continuous body was measured through the mercury press-in method, it was found to be 90% or more. Furthermore, it was confirmed from the result of the tension test that, even when a strain of 20% was applied by tensile stress, the obtained co-continuous body does not depart from the elastic region and is restored to the shape before the application of the stress.

Such a co-continuous body made of graphene was cut into a circular shape having a diameter of 14 mm by using a punching blade, laser cutter or the like, thereby obtaining a gas diffusion type air electrode.

An anode was adjusted by cutting a commercially available metal zinc plate (thickness: 300 μm, manufactured by The Nilaco Corporation) into a circular shape having a diameter of 14 mm by using a punching blade, laser cutter or the like. As an electrolytic solution, a solution prepared by dissolving potassium chloride (KCl, manufactured by KANTO KAGAKU) in pure water at a concentration of 1 mol/L was used. As a separator, a cellulose based separator for batteries (manufactured by NIPPON KODOSHI CORPORATION) was used.

By using the air electrode, the anode, the electrolytic solution as an electrolyte, and the separator mentioned above, a coin cell type zinc air battery described with reference to FIG. 6 was fabricated. At first, the air electrode described above was installed in an air electrode case in which the periphery of a copper mesh foil (manufactured by MTI Japan) was fixed to the inside through spot welding. In addition, the periphery of the anode constituted by a metal zinc plate was fixed to a copper mesh foil (manufactured by MTI Japan) through spot welding, and this copper mesh foil was further fixed to an anode case through spot welding. Then, the separator was mounted on the air electrode that had been installed in the air electrode case, and the electrolytic solution was injected into the separator. Subsequently, the air electrode case was covered with the anode case to which the anode had been fixed, and the peripheries of the air electrode case and the anode case were caulked with a coin cell caulking machine, thereby fabricating a coin cell type zinc air battery including a gasket made of a polypropylene.

Figure 8:
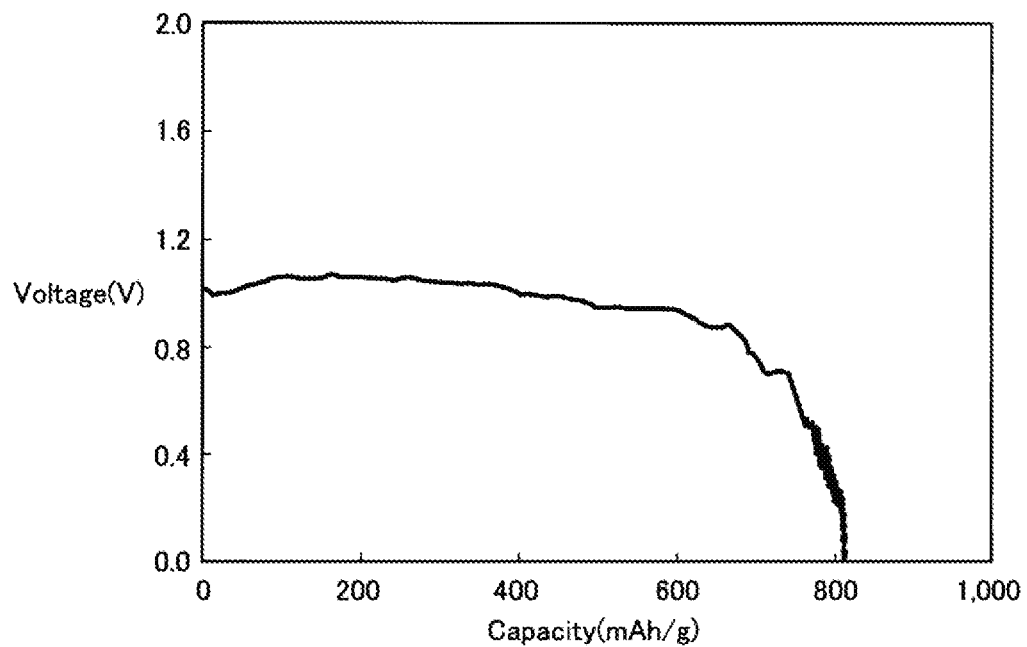
FIG. 8 is a characteristic diagram showing the discharge curve of a metal-air battery according to Example 1 of the present invention.

The battery performance of the coin cell type air battery thus fabricated was measured. At first, a discharge test was performed. The discharge test for the zinc air battery was conducted by using a commercially available charge/discharge measurement system (the SD8 charge/discharge system manufactured by HOKUTO DENKO CORPORATION). An electric current was supplied at a current density of 0.1 mA/cm$^2$ per unit effective area of the air electrode, and measurement was continued until the battery voltage was decreased to 0 V from the open circuit voltage. This measurement was conducted in a thermostatic tank at 25° C. (the atmosphere was an ordinary living environment). The discharge capacity was represented as the value (mAh/g) per weight of the air electrode formed of the co-continuous body. FIG. 8 shows the discharge curve in Example 1.

As shown in FIG. 8, it is found that, when the co-continuous body was used as the air electrode, the average discharge voltage is 1.0 V and the discharge capacity is 810 mAh/g. Note that the average discharge voltage is the battery voltage at the time when the discharge capacity becomes a half (in Example 1, 405 mAh/g) of the discharge capacity of the battery (in the present Example, 810 mAh/g).

The following Table 1 shows the discharge capacities of zinc air batteries in which the co-continuous bodies were constituted from nanosheets made of graphene (C), iron oxide ($Fe_2O_3$), manganese oxide ($MnO_2$), zinc oxide (ZnO), molybdenum oxide ($MoO_3$) and molybdenum sulfide ($MoS_2$) and used as the air electrodes.

TABLE 1

| Nanosheet material | Discharge capacity (mAh/g) |
| --- | --- |
| Graphene (C) | 810 |
| Iron oxide ($Fe_2O_3$) | 860 |
| Manganese oxide ($MnO_2$) | 940 |
| Zinc oxide (ZnO) | 900 |
| Molybdenum oxide ($MoO_3$) | 810 |
| Molybdenum sulfide ($MoS_2$) | 920 |

All zinc air batteries exhibited discharge capacities of 800 mAh/g or more, the values of which are larger than that of Comparative Example 1 for evaluating an air electrode using powdery carbon, which will be mentioned later. In the example cases of nanosheets made of materials other than carbon as well, similar to graphene, they have large specific surface areas and the discharge product [Mg(OH)2] was thus efficiently deposited, and this presumably improved the discharge capacity.

Example 2

Next, Example 2 will be described. Example 2 is an example in which a co-continuous body having a three dimensional network structure formed of a plurality of nanofibers integrated through a noncovalent bond is used as an air electrode. The air electrode was synthesized as follows. In the following description, a production method using carbon nanofibers will be shown as a typical example, but the co-continuous body having a three dimensional network structure can be adjusted by changing the carbon nanofibers to nanofibers made of another material.

The method for evaluating the co-continuous body, the fabrication of a zinc air battery, and the method of a discharge test were carried out in the same manner as in Example 1.

The co-continuous body was fabricated according to the same process as described in Example 1, and a carbon nanofiber sol [a dispersion medium: water (H2O), 0.4% by weight, manufactured by Sigma-Aldrich] was used as a raw material.

The obtained co-continuous body was evaluated by performing XRD measurement, SEM observation, porosity measurement, a tension test, and BET specific surface area measurement. The co-continuous body fabricated in the present invention was confirmed to be a carbon (C, PDF card No. 00-058-1638) single phase through the XRD measurement. It was also confirmed through the SEM observation and the mercury press-in method that the obtained co-continuous body is a co-continuous body in which the nanofibers continuously range and the average pore size is 1 μm. In addition, when the BET specific surface area of the co-continuous body was measured through the mercury press-in method, it was found to be 620 m$^2$/g. Also, when the porosity of the co-continuous body was measured through the mercury press-in method, it was found to be 93% or more. Furthermore, it was confirmed from the result of the tension test that, even when a strain of 40% was applied by tensile stress, the co-continuous body of Example 2 does not depart from the elastic region and is restored to the shape before the application of the stress.

By using this co-continuous body made of carbon nanofibers as an air electrode, a coin cell type zinc air battery similar to those of Example 1 was fabricated. Table 2 shows the discharge capacity of the zinc air battery fabricated in Example 2. In Example 2, the zinc air battery exhibited a discharge capacity of 860 mAh/g, the value of which is larger than that of the case when using the co-continuous body of Example 1 made of graphene. Such an improvement in characteristics is presumably because, by using the co-continuous body having higher stretchability, the reaction during discharge was performed smoothly.

Table 2 shows the discharge capacities of zinc air batteries in which the co-continuous bodies were constituted from carbon nanofibers (C), and nanofibers made of iron oxide ($Fe_2O_3$), manganese oxide ($MnO_2$), zinc oxide (ZnO), molybdenum oxide ($MoO_3$) and molybdenum sulfide ($MoS_2$) and used as the air electrodes.

TABLE 2

| Nanofiber material | Discharge capacity (mAh/g) |
|---|---|
| Carbon nanofiber (C) | 860 |
| Iron oxide ($Fe_2O_3$) | 800 |
| Manganese oxide ($MnO_2$) | 890 |
| Zinc oxide (ZnO) | 880 |
| Molybdenum oxide ($MoO_3$) | 855 |
| Molybdenum sulfide ($MoS_2$) | 840 |

All zinc air batteries exhibited discharge capacities of 800 mAh/g or more, the values of which are larger than those of the co-continuous bodies including the nanosheets as in Example 1, as a whole. In the example cases of these nanofibers as well, similar to the carbon nanofibers, the stretchable air electrodes efficiently deposited the discharge product [$Mg(OH)_2$], and this presumably improved the discharge capacity.

Example 3

Next, Example 3 will be described. In Example 3, an air electrode will be described, which is configured by allowing a co-continuous body made of carbon nanofibers to support an oxide or metal as a catalyst. In the following, a case in which the co-continuous body is allowed to support $MnO_2$ as a catalyst will be described as a typical example, but by changing Mn to an arbitrary metal, an arbitrary oxide is allowed to be supported on the co-continuous body as a catalyst. In addition, by not performing neutralization step, an arbitrary metal is allowed to be supported on the co-continuous body as a catalyst.

The method for evaluating the co-continuous body, the fabrication of a zinc air battery, and the method of a charge/discharge test were carried out in the same manner as in Examples 1 and 2.

The co-continuous body was fabricated in the same manner as in Example 2. Subsequently, commercially available manganese (II) chloride tetrahydrate ($RuCl_2 \cdot 4H_2O$; manufactured by KANTO KAGAKU) was dissolved in distilled water, and the fabricated co-continuous body was impregnated with the solution, thereby allowing manganese chloride to be supported. Then, neutralization was carried out by gradually dropping aqueous ammonia (28%) on the co-continuous body supporting manganese chloride (or on manganese chloride supported by the co-continuous body) until the pH became 7.0, thereby depositing ruthenium hydroxide. The deposit was repeatedly washed with distilled water five times so that no chlorine remained.

The obtained co-continuous body supporting manganese hydroxide was subjected to a heat treatment at 500° C. in an argon atmosphere for 6 hours, thereby fabricating a co-continuous body supporting manganese oxide ($MnO_2$). The co-continuous body supporting manganese oxide thus fabricated was evaluated by performing XRD measurement and TEM observation. Through the XRD measurement, the peak of manganese oxide ($MnO_2$, PDF file No. 00-011-079) were observed. It was confirmed that the catalyst supported by the co-continuous body was a manganese oxide single phase. In addition, with the TEM, manganese oxide was observed to be deposited in the form of particles having an average particle size of 100 nm on the surface of the co-continuous body.

By using this co-continuous body supporting manganese oxide as an air electrode, a coin cell type zinc air battery similar to those of Examples 1 and 2 was fabricated. The discharge capacity of the zinc air battery fabricated in Example 3 was 1250 mAh/g. In addition, the following Table 3 also shows the results when using other catalysts.

TABLE 3

| Catalyst/co-continuous body material | Discharge capacity (mAh/g) |
|---|---|
| $MnO_2$/C | 1250 |
| $Fe_2O_3$/C | 1000 |
| $ZnO_2$/C | 1110 |
| $MoO_3$/C | 1150 |
| Fe/C | 1120 |
| Mn/C | 1210 |
| Zn/C | 1010 |
| Mo/C | 1000 |

In Example 3, the discharge capacity was 1250 mAh/g, the value of which is larger than that of the case when using the co-continuous body of Example 2 not supporting manganese oxide as a catalyst. It was confirmed that the air electrode of the magnesium air battery of the present Example stably operates.

Example 4

Next, Example 4 will be described. In Example 4, a case in which a co-continuous body made of a gel in which nanofibers produced by a bacterium had been dispersed was further allowed to support manganese oxide as a catalyst will be described. In the following, a case in which a co-continuous body was fabricated from nanofibers made of iron oxide produced by an iron bacterium will be described as a typical example, but by changing the iron bacterium to an arbitrary bacterium, a co-continuous body made of nanofibers made of manganese oxide can be adjusted.

The method for evaluating the co-continuous body, the method for fabricating a zinc air battery, and the method of a discharge test were carried out in the same manner as in Examples 1 and 2.

At first, *Leptothrix ochracea*, which is an iron bacterium, was placed in a JOP liquid culture medium in a test tube together with iron pieces (purity: 99.9% or more, manufactured by Kojundo Chemical Lab. Co., Ltd.), and was cultured on a shaker at 20° □ C. for 14 days. The JOP liquid culture medium is a culture medium containing, in 1 L of sterilized ground water, 0.076 g of disodium hydrogen phosphate dodecahydrate, 0.02 g of potassium dihydrogen phosphate dihydrate, 2.383 g of HEPES [4-(2-hydroxyethyl)-1-piperazineethanesulfonic acid: a substance for a buffer solution], and 0.01 mmol/L of iron sulfate, the pH of which is adjusted to 7.0 with an aqueous sodium hydroxide solution. Also, *Leptothrix ochracea* was purchased from ATCC (American Type Culture Collection).

After the culture, the iron pieces were removed, and the obtained gel was washed in pure water for 24 hours by using a shaker. In this washing, pure water was changed three times. By using the washed gel as a raw material, a zinc air battery was fabricated according to the same process as described in Example 1 and Example 3.

The obtained co-continuous body was evaluated by performing XRD measurement, SEM observation, porosity measurement, a tension test, and BET specific surface area measurement. The co-continuous body fabricated in the present invention was confirmed to be amorphous $Fe_3O_4$ and $\gamma$-$Fe_2O_3$ ($Fe_3O_4$, PDF card No. 01-075-1372 and $\gamma$-$Fe_2O_3$, PDF card No. 00-039-1346) through the XRD measurement. It was also confirmed through the SEM observation that the obtained co-continuous body is a co-continuous body in which hollow nanofibers (nanotubes) having a diameter of 1 μm continuously range. In addition, when the BET specific surface area of the co-continuous body was measured through the mercury press-in method, it was found to be 800 $m^2$/g. Also, when the porosity of the co-continuous body was measured through the mercury press-in method, it was found to be 95% or more. Furthermore, it was confirmed from the result of the tension test that, even when a strain of 60% was applied by tensile stress, the co-continuous body of Example 4 does not depart from the elastic region and is restored to the shape before the application of the stress.

The discharge capacity of a zinc air battery using, as an air electrode, the co-continuous body made of the iron oxide nanofibers produced by the iron bacterium in Example 4 was 1470 mAh/g. In addition, the following Table 4 also shows the result when using another co-continuous body.

TABLE 4

| Catalyst/co-continuous body material | Discharge capacity (mAh/g) |
| --- | --- |
| $MnO_2$/bacterium-produced iron oxide | 1470 |
| $MnO_2$/bacterium-produced $MnO_2$ | 1320 |

In Example 4, the zinc air battery exhibited a discharge capacity of 1470 mAh/g, the value of which is to some extent larger than that of the case when using a co-continuous body made of carbon nanofibers supporting manganese oxide as of Example 3. This result is presumably because, by using the co-continuous body having higher stretchability, the reaction during discharge was performed smoothly.

In addition, as shown in Table 4, a zinc air battery including an air electrode using a co-continuous body made of manganese oxide produced by a bacterium and supporting manganese oxide as a catalyst exhibited a discharge capacity of 1320 mAh/g, the value of which is larger than that of Example 3. The manganese oxide produced by a bacterium was produced by culturing *Leptothrix discophora*, which is a manganese bacterium, in the same manner as mentioned above by using manganese pieces (purity: 99.9% or more, manufactured by Kojundo Chemical Lab. Co., Ltd.). *Leptothrix discophora* was purchased from ATCC. In the case of nanofibers produced by this bacterium as well, similar to the iron oxide produced by the iron bacterium, the air electrode produced by the bacterium having excellent stretchability efficiently deposited the discharge product (ZnO), and this presumably improved the discharge capacity.

Example 5

Next, Example 5 will be described. In Example 5, for a case in which a co-continuous body made of a gel in which cellulose produced by a bacterium had been dispersed was further allowed to support manganese oxide as a catalyst, the method for evaluating the co-continuous body, the method for fabricating a zinc air battery, and the method of a charge/discharge test were carried out in the same manner as in Examples 1 and 2.

At first, by using nata de coco (manufactured by Fujicco) as a bacterial cellulose gel produced by *Acetobacter xylinum*, which is an *Acetobacter*, a zinc air battery was fabricated according to the same process as described in Example 1 and Example 3. Note that, in Example 5, a co-continuous body was dried in a vacuum and then carbonized through calcination in a nitrogen atmosphere at 1200° C. for 2 hours, thereby fabricating an air electrode.

The obtained co-continuous body (carbonized co-continuous body) was evaluated by performing XRD measurement, SEM observation, porosity measurement, a tension test, and BET specific surface area measurement. This co-continuous body was confirmed to be a carbon (C, PDF card No. 01-071-4630) single phase through the XRD measurement. It was also confirmed through the SEM observation that the obtained co-continuous body is a co-continuous body in which nanofibers having a diameter of 20 nm continuously range. In addition, when the BET specific surface area of the co-continuous body was measured through the mercury press-in method, it was found to be 830 $m^2$/g. Also, when the porosity of the co-continuous body was measured through the mercury press-in method, it was found to be 99% or more. Furthermore, it was confirmed from the result of the tension test that, even when a strain of 80% was applied by tensile stress, the co-continuous body of Example 5 does not depart from the elastic region and is restored to the shape before the application of the stress, and that the co-continuous body has excellent stretchability even after the carbonization.

The following Table 5 shows the discharge capacity of the zinc air battery in Example 5. Table 5 also shows the results of Examples 1, 2, 3 and 4. In Example 5, the zinc air battery exhibited a discharge capacity of 1650 mAh/g, the value of which is larger than that of the case when using a co-continuous body supporting manganese oxide and containing iron oxide produced by an iron bacterium as of Example 4.

TABLE 5

| Example | Average discharge voltage (V) | Discharge capacity (mAh/g) |
| --- | --- | --- |
| Example 1 (graphene) | 1.0 | 810 |
| Example 2 (carbon nanofiber) | 1.0 | 860 |
| Example 3 ($MnO_2$/carbon nanofiber) | 1.1 | 1250 |
| Example 4 ($MnO_2$/bacterium-produced iron oxide) | 1.1 | 1470 |
| Example 5 ($MnO_2$/carbonized bacterial cellulose) | 1.2 | 1650 |

The improvement in characteristics as described above is presumably because, by using the co-continuous body having higher stretchability, the discharge product [$Zn(OH)_2$] was efficiently deposited during discharge and also the reaction was performed smoothly due to excellent electrical conductivity of C.

As mentioned above, according to the present invention, a co-continuous body having high porosity and stretchability found by the BET specific surface area measurement is obtained. In addition, a zinc air battery using this co-continuous body as an air electrode achieves efficient deposition of the discharge product [$Zn(OH)_2$] during discharge.

The improvement in characteristics as described above is presumably because of a variety of improvements according to the present invention.

Example 6

Next, Example 6 will be described. In Example 6, for a case in which the co-continuous body of Example 5 was used and the type of metal used for the anode was changed, the method for fabricating a battery and the method of a charge/discharge test were carried out in the same manner as in Examples 1 and 2.

The following Table 6 shows the discharge capacities of metal-air batteries in which a magnesium plate, a magnesium alloy AZ31 plate, a magnesium alloy AZX plate, an aluminum plate, a zinc plate and an iron plate were used as anodes.

TABLE 6

| Anode metal | Average discharge voltage (V) | Discharge capacity (mAh/g) |
| --- | --- | --- |
| Zinc | 1.2 | 1650 |
| Magnesium alloy AZ31 | 1.3 | 1820 |
| Magnesium alloy AZX | 1.3 | 1720 |
| Aluminum | 1.1 | 1480 |
| Iron | 1.1 | 1510 |

In Example 6, when a magnesium alloy AZ31 plate was used as the anode, the battery exhibited a discharge capacity of 1820 mAh/g and a voltage of about 1.3 V, both values of which are larger than those of the cases when using other metals.

The difference in characteristics as described above may be attributed to the ease of dissolution in the electrolytic solution due to the ionization tendency of the metals. Therefore, it is presumably because, when the magnesium alloy AZ31 plate was used as the anode, electrons generated along with the dissolution of the anode metal were utilized for the battery reaction most efficiently.

As mentioned above, when the magnesium alloy AZ31 plate is used for the anode of a metal-air battery using the co-continuous body according to the present invention as the air electrode, the most efficient flow of electrons during discharge is achieved. The improvement in characteristics as described above is presumably because of a variety of improvements according to the present invention.

Example 7

Next, Example 7 will be described. In Example 7, for a case in which the co-continuous body that is the same as that of Example 5 was used, the magnesium alloy AZ31 plate was used for the anode, and the electrolyte was changed, the method for fabricating a battery and the method of a charge/discharge test were carried out in the same manner as in Examples 1 and 2. For adjustment of the electrolytic solution, a solution prepared by dissolving in pure water at a concentration of 1 mol/L was used, as in Example 1. However, the solubilities of magnesium citrate and calcium citrate in water are low, and therefore, solutions obtained by dissolving them in a 0.1 mol/L citric acid were used.

The following Table 7 shows the discharge capacities and pH values before and after measurement of metal-air batteries using acetic acid, sodium acetate, magnesium acetate, potassium acetate, calcium acetate, carbonic acid, sodium carbonate, magnesium carbonate, potassium carbonate, calcium carbonate, citric acid, sodium citrate, magnesium citrate, potassium citrate, calcium citrate, phosphoric acid, HEPES, sodium pyrophosphate and sodium metaphosphate as electrolytes.

Figure 9:
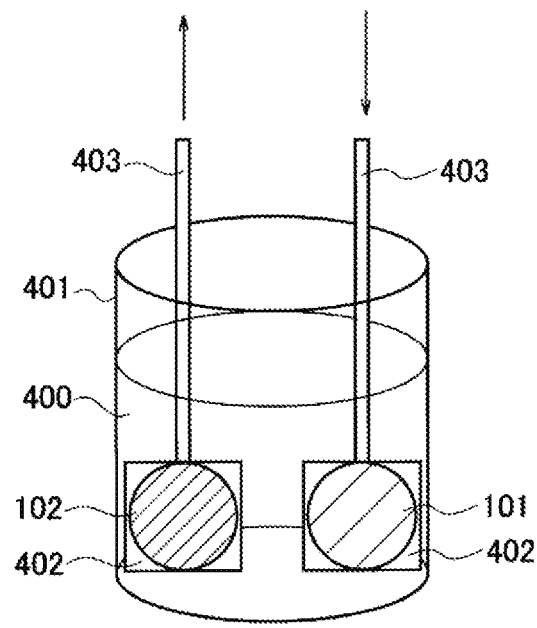
FIG. 9 is a constitutional view illustrating the configuration of a metal-air battery according to Example 7 of the present invention upon pH measurement.

For the pH measurement, a pH measuring instrument (manufactured by HORIBA, Ltd., D-52) was used, and as shown in FIG. 9, the battery reaction was allowed to progress in a beaker cell 401 filled with an electrolytic solution 400 and the pH before and after the reaction was measured. The anode 102 and the air electrode 101 were adjusted by cutting into a circular shape having a diameter of 14 mm by using a punching blade, laser cutter or the like. At first, the periphery of a copper mesh foil 402 (manufactured by MTI Japan) was fixed through spot welding, and the air electrode 101 described above was installed inside the copper mesh foil 402. Also, the anode 102 constituted by the magnesium alloy AZ31 plate was similarly fixed to the inside of another copper mesh foil 402 (manufactured by MTI Japan) through spot welding. To each of these copper mesh foils, a copper ribbon 403 was fixed through spot welding in advance. A charge/discharge measurement system (manufactured by HOKUTO DENKO CORPORATION, the SD8 charge/discharge system) not illustrated was connected to these copper ribbons 403. Then, an electric current was supplied at a current density of 0.1 mA/cm$^2$ per unit effective area of the air electrode 101, and the electric current was kept supplied until the battery voltage was decreased to 0 V from the open circuit voltage.

TABLE 7

| Electrolyte | Discharge capacity (mAh/g) | pH Before | pH After |
| --- | --- | --- | --- |
| Potassium chloride (comparative) | 1650 | 7.1 | 11.7 |
| Acetic acid | 1910 | 6.5 | 10.8 |
| Sodium acetate | 1920 | 6.2 | 10.6 |
| Magnesium acetate | 1990 | 6.1 | 10.6 |
| Potassium acetate | 1930 | 6.2 | 10.5 |
| Calcium acetate | 1910 | 5.9 | 10.4 |
| Carbonic acid | 1680 | 6.7 | 11.3 |
| Sodium carbonate | 1670 | 7.2 | 11.4 |
| Magnesium carbonate | 1690 | 7.2 | 11.2 |
| Potassium carbonate | 1670 | 7.3 | 11.4 |
| Calcium carbonate | 1660 | 6.8 | 11.0 |
| Citric acid | 1710 | 6.1 | 10.6 |
| Sodium citrate | 1780 | 6.3 | 10.5 |
| Magnesium citrate | 1880 | 5.9 | 10.4 |
| Potassium citrate | 1760 | 6.4 | 10.7 |
| Calcium citrate | 1770 | 6.3 | 10.6 |
| Phosphoric acid | 1810 | 5.2 | 10.1 |
| HEPES | 1690 | 6.3 | 10.5 |
| Sodium pyrophosphate | 1740 | 6.1 | 10.6 |
| Sodium metaphosphate | 1720 | 6.2 | 10.4 |

In Example 7, when magnesium acetate was used as the electrolyte, the battery exhibited a discharge capacity of 1990 mAh/g, the value of which is larger than the case when using potassium chloride as the electrolyte as in Examples 1 to 6.

The improvement in characteristics as described above is presumably because, by using the electrolytic solution containing no chloride ion, corrosion of the anode by chloride ions can be suppressed, which is believed to have the greatest impact on the discharge capacity. Furthermore, when a weak acidic salt such as an acetate and a citrate is used, the discharge capacity is presumably further improved because the pH rise in the electrolytic solution can be suppressed and passivation on the anode surface becomes unlikely to occur. Among the categories of acetates, carbonates and citrates, magnesium salts have the largest capacity, which may be due to the fact that dissolving magnesium salts as electrolytes suppresses self corrosion of magnesium in the anode.

As mentioned above, according to the present invention, the use of magnesium acetate achieves improvement in the discharge capacity. In addition, since magnesium acetate is a component also used as a fertilizer, an electrolytic solution using it is also preferable from the viewpoint of environmental load. The improvement in characteristics as described above is presumably because of a variety of improvements according to the present invention.

Example 8

Next, Example 8 will be described. In Example 8, based on the results of Examples 1 to 7, a magnesium air battery that is naturally degradable together with the housing described with reference to FIG. 7 was fabricated, in which a co-continuous body made of a gel in which cellulose produced by a bacterium had been dispersed was further allowed to support manganese oxide as a catalyst, a magnesium alloy was used as the anode, and magnesium acetate was used as the electrolyte. The method for synthesizing a co-continuous body that is allowed to support manganese oxide as a catalyst, the method for evaluating a co-continuous body, and the method of a charge/discharge test were performed in the same manner as in Example 5.

Hereinafter, the method for fabricating a magnesium air battery according to Example 8 will be described. An anode was fabricated by using scissors to cut a commercially available magnesium alloy AZ31 plate (thickness: 200 μm, manufactured by The Nilaco Corporation) into a square of 20 mm×20 mm.

As an electrolytic solution, a solution prepared by dissolving magnesium acetate ($Mg(CH_3COO)_2$, manufactured by KANTO KAGAKU) in pure water at a concentration of 1 mol/L was used. As a separator, a cellulose based separator for batteries (manufactured by NIPPON KODOSHI CORPORATION) was cut into a square of 25 mm×25 mm for use.

The periphery of the anode formed of the magnesium alloy plate was fixed to a copper mesh foil (manufactured by MTI Japan), which is an anode current collector, through spot welding. Furthermore, this copper mesh foil was cut into 25 mm×25 mm in a planar view, and the end of the cut foil was spot welded to the short side of a copper foil (manufactured by The Nilaco Corporation) cut into 3×20 mm, which is to be a terminal.

In addition, to a copper mesh foil (manufactured by MTI Japan) cut into 25 mm×25 mm as a current collector for the air electrode, the air electrode was bonded with pressure, and the end of this copper mesh foil was spot welded to the short side of a copper foil (manufactured by The Nilaco Corporation) cut into 3×20 mm, which is to be a terminal.

As the material of the housing, a plant based film sheet ECOLOJU (manufactured by Mitsubishi Plastics, Inc.) was used. By cutting this sheet into 30 mm×30 mm in a planar view, two cut sheets were fabricated, and one of the cut sheets was used as a first housing and the other was used as a second housing. Also, a 15 mm×15 mm opening was formed in the central portion of the second housing to be used on the side of the cathode.

The anode current collector to which the anode had been fixed and the separator were arranged on the first housing on the side of the anode, and furthermore, the electrolytic solution was injected into the separator. The first housing was covered with the air electrode current collector to which the air electrode had been bonded with pressure and with the second housing, and the inner peripheries (width: about 5 mm) of the first and second housings were bonded and sealed with a biodegradable resin (manufactured by MIYOSHI OIL & FAT CO., LTD.). By doing such, a magnesium air battery was fabricated.

Table 8 shows the discharge capacity of the magnesium air battery in Example 8. Table 8 also shows the results of Examples 5, 6, 7, 8 and 9. As shown in Table 8, the battery in Example 8 exhibited a discharge capacity of 1860 mAh/g, which is almost the same discharge characteristic as that of Example 6.

TABLE 8

| Example | Anode metal | Electrolyte | pH Before | pH After | Average discharge voltage (V) | Discharge capacity (mAh/g) |
|---|---|---|---|---|---|---|
| Example 5 | Zinc | Potassium chloride | 7.1 | 11.7 | 1.2 | 1650 |
| Example 6 | Magnesium alloy | | 7.0 | 11.1 | 1.3 | 1820 |
| Example 7 | | Magnesium acetate | 6.1 | 10.6 | 1.5 | 1990 |
| Example 8 | | | — | — | 1.4 | 1860 |
| Example 9 | | | — | — | 1.4 | 1640 |
| Comparative Example 1 | Zinc | Potassium chloride | 7.2 | 11.2 | 0.9 | 680 |

When the magnesium air battery in Example 8 was installed in soil after discharge, decomposition of the housings was visually confirmed in about half a month, and the battery completely disappeared in about a month. This indicates that the battery was metabolized and decomposed by microorganisms in soil.

Example 9

Next, Example 9 will be described. In Example 9, a discharge test was carried out on a magnesium air battery fabricated according to the same procedure as in Example 8, under an environment imitating soil. Specifically, a 1/10,000a Neubauer pot was filled with 540 g of decomposed granite soil that had been filtered through a 2 mm sieve and covered with 70 g of sandy soil, and the above magnesium battery was embedded so that only the terminals thereof were exposed on top of the sandy soil. These terminals were connected to a measuring apparatus and the discharge capacity was measured in the same manner as in Example 1.

The discharge capacity of the magnesium air battery in Example 9 is shown in the above Table 8. As shown in Table 8, the magnesium air battery in Example 9 exhibited a discharge capacity of 1640 mAh/g, which is lower than that in Example 8, but this value demonstrates that the battery operates with no problem even under the soil environment. Also, when the magnesium air battery in Example 8 was left to stand in soil after discharge, the battery completely disappeared in about a month from the start of the discharge test.

Comparative Example 1

Next, Comparative Example 1 will be described. In Comparative Example 1, a magnesium air battery cell using carbon (KETJENBLACK EC600JD), which is publicly known as an electrode for air electrodes, and manganese oxide was fabricated and evaluated. In Comparative Example 1, a coin cell type zinc air battery similar to that in Example 1 was fabricated. As an electrolyte, potassium chloride (1 mol/L) was used as in Example 5.

Manganese oxide powder (manufactured by KANTO KAGAKU), KETJENBLACK powder (manufactured by Lion Specialty Chemicals Co., Ltd.) and polytetrafluoroethylene (PTFE) powder (manufactured by DAIKIN INDUSTRIES, LTD.) were sufficiently pulverized and mixed at a weight ratio of 50:30:20 by using a mortar machine, and subjected to roll forming, thereby fabricating a sheet-like electrode (thickness: 0.5 mm). By cutting this sheet-like electrode into a circular shape having a diameter of 14 mm, an air electrode was obtained. The conditions of a discharge test for the battery were the same as in Example 1.

The discharge capacity of the zinc air battery according to Comparative Example 1 is shown in Table 8, together with the results of Examples 5 to 9. As shown in Table 8, the zinc air battery of Comparative Example 1 exhibited a discharge capacity of 680 mAh/g, the value of which is smaller than that in Example 1. In addition, when the air electrode of Comparative Example 1 was observed after the measurement, it was found that the air electrode partially collapsed and was dispersed in the electrolytic solution, and that the electrode structure of the air electrode was destroyed.

From the above results, it was confirmed that the metal-air batteries of the present invention are superior in capacity and voltage to a metal-air battery using an air electrode made of a publicly known material.

As described above, according to the present invention, since the air electrode 101 of the metal-air battery is constituted by the co-continuous body having a three dimensional network structure formed of a plurality of nanostructures integrated through a noncovalent bond, it becomes easier to handle the metal-air battery. The metal-air battery of the present invention does not contain any metal elements other than the elements used in fertilizers for soil or metals contained in rain water and sea water, and is also naturally degradable, which extremely decreases the environmental load. Such a battery can be effectively utilized as a disposable battery in a daily environment, as well as the driving source for various devices such as a sensor to be used in soil.

In addition, according to the present invention, by appropriately selecting the type of anode metal and the type of electrolytic solution, the discharge capacity of the metal-air battery can be increased. That is, the air electrode 101 of the metal-air battery is constituted by a co-continuous body having a three dimensional network structure formed of a plurality of nanostructures integrated through a noncovalent bond and the electrolyte 103 disposed between the air electrode and the anode is constituted by a salt containing no chloride ion, and therefore, efficient utilization of electrons and suppression of passivation and self corrosion of the anode can be achieved, thereby increasing the discharge capacity of the metal-air battery. Furthermore, since the anode 102 is constituted by any metal among magnesium, aluminum, calcium, iron and zinc, or an alloy thereof, the discharge capacity of the metal-air battery can be made even larger.

Note that the present invention is not limited to the embodiments described above, and it is obvious that those having ordinary skill in the art can make many modifications and combinations without departing from the technical idea of the invention.

REFERENCE SIGNS LIST

101 Air electrode
102 Anode
103 Electrolyte
201 Air electrode case
202 Anode case
203 Gasket
300 Housing
301 Anode current collector
302 Cathode current collector
311 First housing
312 Second housing
321 Terminal
322 Terminal
400 Electrolytic solution
401 Beaker cell
402 Copper mesh foil
403 Copper ribbon

The invention claimed is:

1. A metal-air battery comprising:
an air electrode constituted by a co-continuous body having a three dimensional network structure in which a plurality of nanostructures is integrated through a noncovalent bond;
an anode; and
an electrolyte disposed between the air electrode and the anode and constituted by a salt containing no chloride ion;
wherein a nanostructure of the air electrode is a nanosheet constituted by at least one of carbon, iron oxide, manganese oxide, zinc oxide, molybdenum oxide or molybdenum sulfide, or a nanofiber constituted by at least one of carbon, iron oxide, manganese oxide, zinc oxide, molybdenum oxide, molybdenum sulfide or cellulose; and
the air electrode supports a catalyst constituted by at least one metal selected from iron, manganese, zinc, copper or molybdenum, or an oxide of at least one metal selected from calcium, iron, manganese, zinc, copper or molybdenum.

2. The metal-air battery according to claim 1, wherein the electrolyte is constituted by at least one of an acetate, a carbonate, a citrate, a phosphate, HEPES (4-(2-hydroxyethyl)-1-piperazineethanesulfonic acid), a pyrophosphate or a metaphosphate.

3. The metal-air battery according to claim 2, wherein the electrolyte is an electrolytic solution or a solid electrolyte in a range from weak acidity to neutrality.

4. The metal-air battery according to claim 2, wherein the anode is constituted by at least one of magnesium, aluminum, calcium, iron or zinc.

5. The metal-air battery according to claim 1, wherein the electrolyte is an electrolytic solution or a solid electrolyte in a range from weak acidity to neutrality.

6. The metal-air battery according to claim 5, wherein the anode is constituted by at least one of magnesium, aluminum, calcium, iron or zinc.

7. The metal-air battery according to claim 1, wherein the anode is constituted by at least one of magnesium, aluminum, calcium, iron or zinc.

8. A method for producing an air electrode of a metal-air battery wherein the air electrode is constituted by a co-continuous body having a three dimensional network structure in which a plurality of nanostructures is integrated through a noncovalent bond; an anode; and an electrolyte disposed between the air electrode and the anode and constituted by a salt containing no chloride ion, wherein the method comprises:
a gel production step of allowing a bacterium to produce a gel in which nanofibers made of iron oxide or manganese oxide are dispersed;
a freezing step of freezing the gel; and
a drying step of drying the frozen body of the gel.

9. A method for producing the air electrode of the metal-air battery according to claim 8, wherein the electrolyte is constituted by at least one of an acetate, a carbonate, a citrate, a phosphate, HEPES (4-(2-hydroxyethyl)-1-piperazineethanesulfonic acid), a pyrophosphate or a metaphosphate.

10. A method for producing the air electrode of the metal-air battery according to claim 8, wherein the electrolyte is an electrolytic solution or a solid electrolyte in a range from weak acidity to neutrality.

11. A method for producing the air electrode of the metal-air battery according to claim 8, wherein the anode is constituted by at least one of magnesium, aluminum, calcium, iron or zinc.

12. A method for producing the air electrode of the metal-air battery according to claim 8, wherein a nanostructure of the air electrode is a nanosheet constituted by at least one of carbon, iron oxide, manganese oxide, zinc oxide, molybdenum oxide or molybdenum sulfide, or a nanofiber constituted by at least one of carbon, iron oxide, manganese oxide, zinc oxide, molybdenum oxide, molybdenum sulfide or cellulose; and
the air electrode supports a catalyst constituted by at least one metal selected from iron, manganese, zinc, copper or molybdenum, or an oxide of at least one metal selected from calcium, iron, manganese, zinc, copper or molybdenum.

13. A method for producing an air electrode of a metal-air battery wherein the air electrode is constituted by a co-continuous body having a three dimensional network structure in which a plurality of nanostructures is integrated through a noncovalent bond; an anode; and an electrolyte disposed between the air electrode and the anode and constituted by a salt containing no chloride ion, wherein the method comprises:
a gel production step of allowing a bacterium to produce a gel in which nanofibers made of cellulose are dispersed;
a freezing step of freezing the gel;
a drying step of drying the frozen body of the gel; and
a carbonization step of carbonizing the co-continuous body obtained by the drying, by heating in a gas atmosphere in which the cellulose is not burned.

14. A method for producing the air electrode of the metal-air battery according to claim 13, wherein the electrolyte is constituted by at least one of an acetate, a carbonate, a citrate, a phosphate, HEPES (4-(2-hydroxyethyl)-1-piperazineethanesulfonic acid), a pyrophosphate or a metaphosphate.

15. A method for producing the air electrode of the metal-air battery according to claim 13, wherein the electrolyte is an electrolytic solution or a solid electrolyte in a range from weak acidity to neutrality.

16. A method for producing the air electrode of the metal-air battery according to claim 13, wherein the anode is constituted by at least one of magnesium, aluminum, calcium, iron or zinc.

* * * * *